US009652799B2

(12) United States Patent
Boston et al.

(10) Patent No.: US 9,652,799 B2
(45) Date of Patent: May 16, 2017

(54) PRODUCT RECOMMENDATION WITH PRODUCT REVIEW ANALYSIS

(71) Applicant: Nuance Communications, Inc., Burlington, MA (US)

(72) Inventors: Marisa Ferrara Boston, Saline, MI (US); Richard Stamford Crouch, Cupertino, CA (US); Sylvain Goulet, Montreal (CA); Ali Erdem Ozcan, Montreal (CA); Francis Pieraut, Lachine (CA); Peter Stubley, Lachine (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/576,051

(22) Filed: Dec. 18, 2014

(65) Prior Publication Data

US 2016/0180438 A1    Jun. 23, 2016

(51) Int. Cl.

| *G06Q 30/06* | (2012.01) |
| *G06F 17/21* | (2006.01) |
| *G06F 17/27* | (2006.01) |
| *G06Q 30/02* | (2012.01) |

(52) U.S. Cl.
CPC ......... *G06Q 30/0631* (2013.01); *G06F 17/21* (2013.01); *G06F 17/2775* (2013.01); *G06Q 30/0282* (2013.01)

(58) Field of Classification Search
CPC ............ G06Q 30/0631; G06Q 30/0601; G06F 17/2705

USPC ............................................... 705/26.1, 26.7
See application file for complete search history.

(56) References Cited

U.S. PATENT DOCUMENTS

| 7,313,515 | B2 | 12/2007 | Crouch et al. |
| 8,515,828 | B1* | 8/2013 | Wolf ..................... G06Q 30/02 705/26.1 |
| 2004/0148226 | A1* | 7/2004 | Shanahan ....................... 705/26 |
| 2007/0118498 | A1* | 5/2007 | Song et al. ....................... 707/1 |
| 2012/0095863 | A1* | 4/2012 | Schiff et al. ................. 705/26.7 |
| 2013/0218880 | A1* | 8/2013 | McConnell et al. .......... 707/724 |
| 2013/0218884 | A1* | 8/2013 | McConnell et al. .......... 707/728 |
| 2014/0214479 | A1* | 7/2014 | Singel et al. ................ 705/7.29 |
| 2014/0249963 | A1* | 9/2014 | Shanahan .................. 705/26.62 |

(Continued)

OTHER PUBLICATIONS

U.S. Appl. No. 14/575,404, filed Dec. 18, 2014, Stubley et al.

(Continued)

*Primary Examiner* — Mila Airapetian
(74) *Attorney, Agent, or Firm* — Wolf, Greenfield & Sacks, P.C.

(57) ABSTRACT

Techniques for product recommendation involve receiving, from a user, a text input expressing a question asking for a product recommendation. In response to the question, an answer that identifies a product for recommendation to the user may be generated. A plurality of product reviews comprising natural language text evaluations of the product may be analyzed, involving identifying at least one passage of text in at least one of the product reviews as providing supporting evidence for the product in answer to the question. The answer and the at least one passage in the at least one product review identified as providing supporting evidence for the answer may be presented to the user in response to the text input.

18 Claims, 10 Drawing Sheets

(56) References Cited

U.S. PATENT DOCUMENTS

2015/0088684 A1* 3/2015 Nygaard et al. ............. 705/26.7
2015/0262238 A1* 9/2015 Aitchison .......... G06Q 30/0263
                                                    705/14.6
2015/0356640 A1* 12/2015 Flores ................ G06Q 30/0625
                                                   705/26.62

OTHER PUBLICATIONS

U.S. Appl. No. 14/575,462, filed Dec. 18, 2014, Boston et al.
U.S. Appl. No. 14/576,023, filed Dec. 18, 2014, Boston et al.
U.S. Appl. No. 14/485,176, filed Sep. 12, 2014, Crouch et al.

* cited by examiner

 Q: Show me a tablet under $600 with a slim design.

Apple iPad Air $499

Slimmer, lighter, and faster than last year's model, Apple's iPad Air ($499-$929) is the best tablet for the most people. It's a full-fledged computer that's now so thin and light that you won't even notice it's in your bag.

The iPad Air delivers more performance and comparable battery life in an attractive and impossibly thin-and-light package.

Toshiba Excite 10 LE $529

The thinnest you can buy right now, the Toshiba Excite 10 LE is a fine midrange Android tablet, but you're paying a premium for its slim design.

FIG. 3A

Q: Show me a tablet under $600 with a slim design.

Q: I want an Android OS.

Toshiba Excite 10 LE                            $529

The thinnest you can buy right now, the Toshiba Excite 10 LE is a fine midrange Android tablet, but you're paying a premium for its slim design.

PRODUCT RECOMMENDATION WITH PRODUCT REVIEW ANALYSIS

BACKGROUND

Question answering (QA) is a field in computer technology that attempts to automatically provide answers to questions input by humans, often in natural language format. For example, in response to the input question, "What is the capital of Liechtenstein?" a QA system would be tasked with determining and outputting the answer that the capital of Liechtenstein is Vaduz.

While some QA systems may perform searches on text documents, such as web pages, as part of the process of identifying answers to questions, QA systems differ from document search and retrieval systems such as typical Internet search engines. The latter systems typically perform keyword searches to retrieve documents (e.g., web pages) that contain keywords from the search query. For example, if "What is the capital of Liechtenstein?" were input as a search query to a conventional Internet search engine, the output would typically be a list of one or more web pages whose texts contain the keywords "capital" and "Liechtenstein." The user might then be able to examine each returned document to see if it contains the answer that the user was looking for (i.e., that the capital city is Vaduz).

SUMMARY

One type of embodiment is directed to a method comprising: receiving, from a user, a text input expressing a question in natural language; analyzing the text input, using an analysis component implemented via at least one processor, the analyzing comprising identifying in the question at least one first portion answerable from at least one structured data source, and at least one second portion answerable from at least one unstructured data source; constructing, from the at least one first portion of the question, at least one first query configured for the at least one structured data source, and applying the at least one first query to the at least one structured data source to retrieve first answer information for the at least one first portion of the question; and constructing, from the at least one second portion of the question, at least one second query configured for the at least one unstructured data source, and applying the at least one second query to the at least one unstructured data source to retrieve second answer information for the at least one second portion of the question.

Another type of embodiment is directed to at least one computer-readable storage medium storing computer-executable instructions that, when executed, perform a method comprising: receiving, from a user, a text input expressing a question in natural language; analyzing the text input, the analyzing comprising identifying in the question at least one first portion answerable from at least one structured data source, and at least one second portion answerable from at least one unstructured data source; constructing, from the at least one first portion of the question, at least one first query configured for the at least one structured data source, and applying the at least one first query to the at least one structured data source to retrieve first answer information for the at least one first portion of the question; and constructing, from the at least one second portion of the question, at least one second query configured for the at least one unstructured data source, and applying the at least one second query to the at least one unstructured data source to retrieve second answer information for the at least one second portion of the question.

Another type of embodiment is directed to apparatus comprising at least one processor and at least one storage medium storing processor-executable instructions that, when executed by the at least one processor, perform a method comprising: receiving, from a user, a text input expressing a question in natural language; analyzing the text input, the analyzing comprising identifying in the question at least one first portion answerable from at least one structured data source, and at least one second portion answerable from at least one unstructured data source; constructing, from the at least one first portion of the question, at least one first query configured for the at least one structured data source, and applying the at least one first query to the at least one structured data source to retrieve first answer information for the at least one first portion of the question; and constructing, from the at least one second portion of the question, at least one second query configured for the at least one unstructured data source, and applying the at least one second query to the at least one unstructured data source to retrieve second answer information for the at least one second portion of the question.

Another type of embodiment is directed to a method comprising: receiving, from a user, a text input expressing a question in natural language; generating, in response to the question, a text output expressing an answer to the question; analyzing, using a language analysis component implemented via at least one processor, a plurality of documents comprising natural language text, the analyzing comprising mapping the question to one or more hypotheses, analyzing at least one passage of text in at least one of the plurality of documents to determine whether the at least one passage entails at least one of the one or more hypotheses, and in response to determining that the at least one passage entails at least one of the one or more hypotheses, identifying the at least one passage as providing supporting evidence for the answer to the question; and presenting to the user, in response to the text input, the answer and the at least one passage from the at least one of the documents identified as providing supporting evidence for the answer.

Another type of embodiment is directed to at least one computer-readable storage medium storing computer-executable instructions that, when executed, perform a method comprising: receiving, from a user, a text input expressing a question in natural language; generating, in response to the question, a text output expressing an answer to the question; analyzing a plurality of documents comprising natural language text, the analyzing comprising mapping the question to one or more hypotheses, analyzing at least one passage of text in at least one of the plurality of documents to determine whether the at least one passage entails at least one of the one or more hypotheses, and in response to determining that the at least one passage entails at least one of the one or more hypotheses, identifying the at least one passage as providing supporting evidence for the answer to the question; and presenting to the user, in response to the text input, the answer and the at least one passage from the at least one of the documents identified as providing supporting evidence for the answer.

Another type of embodiment is directed to apparatus comprising at least one processor and at least one storage medium storing processor-executable instructions that, when executed by the at least one processor, perform a method comprising: receiving, from a user, a text input expressing a question in natural language; generating, in response to the question, a text output expressing an answer to the question; analyzing a plurality of documents comprising natural language text, the analyzing comprising mapping the question to one or more hypotheses, analyzing at least one passage of text in at least one of the plurality of documents to determine whether the at least one passage entails at least one of the one or more hypotheses, and in response to determining that the at least one passage entails at least one of the one or more hypotheses, identifying the at least one passage as providing supporting evidence for the answer to the question; and presenting to the user, in response to the text input, the answer and the at least one passage from the at least one of the documents identified as providing supporting evidence for the answer.

Another type of embodiment is directed to a method comprising: receiving, from a user, a text input expressing a question asking for a product recommendation; generating, in response to the question, an answer that identifies a product for recommendation to the user; analyzing, using a language analysis component implemented via at least one processor, a plurality of product reviews comprising natural language text evaluations of the product, the analyzing comprising identifying at least one passage of text in at least one product review of the plurality of product reviews as providing supporting evidence for the product in answer to the question; and presenting to the user, in response to the text input, the answer and the at least one passage in the at least one product review identified as providing supporting evidence for the answer.

Another type of embodiment is directed to at least one computer-readable storage medium storing computer-executable instructions that, when executed, perform a method comprising: receiving, from a user, a text input expressing a question asking for a product recommendation; generating, in response to the question, an answer that identifies a product for recommendation to the user; analyzing a plurality of product reviews comprising natural language text evaluations of the product, the analyzing comprising identifying at least one passage of text in at least one product review of the plurality of product reviews as providing supporting evidence for the product in answer to the question; and presenting to the user, in response to the text input, the answer and the at least one passage in the at least one product review identified as providing supporting evidence for the answer.

Another type of embodiment is directed to apparatus comprising at least one processor and at least one storage medium storing processor-executable instructions that, when executed by the at least one processor, perform a method comprising: receiving, from a user, a text input expressing a question asking for a product recommendation; generating, in response to the question, an answer that identifies a product for recommendation to the user; analyzing a plurality of product reviews comprising natural language text evaluations of the product, the analyzing comprising identifying at least one passage of text in at least one product review of the plurality of product reviews as providing supporting evidence for the product in answer to the question; and presenting to the user, in response to the text input, the answer and the at least one passage in the at least one product review identified as providing supporting evidence for the answer.

Another type of embodiment is directed to a method comprising: receiving, from a user, a request for recommendation of a product matching one or more characteristics specified in the request; identifying a product for recommendation in response to the request, at least in part by searching, using at least one processor, an ontology in which the identified product is represented as matching at least one characteristic of the one or more characteristics specified in the request, the ontology further including at least one link to at least one natural language product review providing supporting evidence that the identified product matches the at least one characteristic; retrieving at least a portion of the at least one natural language product review using the at least one link in the ontology; and presenting to the user, in response to the request, the retrieved at least a portion of the at least one natural language product review in support of a recommendation of the identified product.

Another type of embodiment is directed to at least one computer-readable storage medium storing computer-executable instructions that, when executed, perform a method comprising: receiving, from a user, a request for recommendation of a product matching one or more characteristics specified in the request; identifying a product for recommendation in response to the request, at least in part by searching an ontology in which the identified product is represented as matching at least one characteristic of the one or more characteristics specified in the request, the ontology further including at least one link to at least one natural language product review providing supporting evidence that the identified product matches the at least one characteristic; retrieving at least a portion of the at least one natural language product review using the at least one link in the ontology; and presenting to the user, in response to the request, the retrieved at least a portion of the at least one natural language product review in support of a recommendation of the identified product.

Another type of embodiment is directed to apparatus comprising at least one processor and at least one storage medium storing processor-executable instructions that, when executed by the at least one processor, perform a method comprising: receiving, from a user, a request for recommendation of a product matching one or more characteristics specified in the request; identifying a product for recommendation in response to the request, at least in part by searching an ontology in which the identified product is represented as matching at least one characteristic of the one or more characteristics specified in the request, the ontology further including at least one link to at least one natural language product review providing supporting evidence that the identified product matches the at least one characteristic; retrieving at least a portion of the at least one natural language product review using the at least one link in the ontology; and presenting to the user, in response to the request, the retrieved at least a portion of the at least one natural language product review in support of a recommendation of the identified product.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A and 3B illustrate an exemplary user interface that may be utilized in connection with some embodiments;

DETAILED DESCRIPTION

Figure 1:
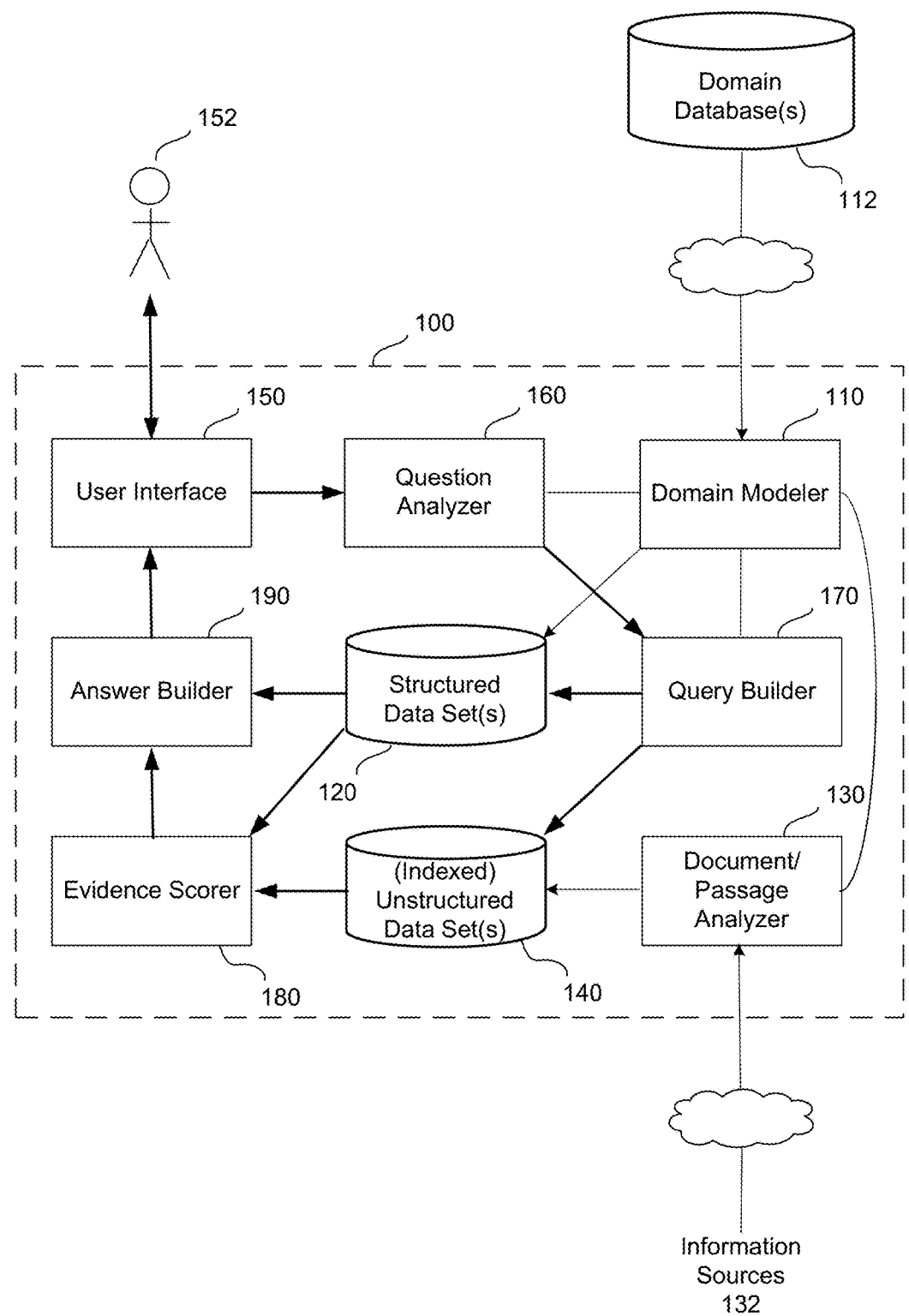
FIG. 1 is a block diagram of an exemplary operating environment for an exemplary question answering system in accordance with some embodiments.

The inventors have recognized that different techniques in question answering are appropriate, depending on the type of knowledge base accessed by the QA system in identifying answers to questions. Some QA systems search structured data sources, such as databases, to retrieve information useful in determining an answer to a user's question. As used herein, the term "structured data" refers to data in which each item of information that can be returned in response to a search query is stored in association with one or more fields, categories, or other organizational labels through which the data set is organized according to a defined scheme. Examples of structured data sources include RDF stores, databases, tables, spreadsheets, forms, relational databases, including structured query language (SQL) databases, etc. For example, a structured data source such as a database could be organized as a set of tables, in which each column in a table represents a category of information. An individual row in such a table may be an information item returnable by a search query, and may include entries for each of the information categories (i.e., table columns) applicable to that row entry. The row entry could also be categorized by the particular table of which it is a member. An individual cell within a row entry could also be an information item returnable by a search query, and could be categorized by its table, row, and column designations. For instance, a movie database could be organized into different tables for different genres of movies (action, drama, sci-fi, etc.). Within the tables, row entries could represent individual movies, and columns could represent information categories such as a movie's title, release date, length, director, etc. A row entry representing a particular movie could be returned in response to a search query, including the various column entries for that row. A particular row-column entry (table cell) could also be returned in response to a search query, representing, e.g., the release date of a particular movie, etc.

On the other hand, "unstructured data" refers herein to data in which not all items of information that can be returned in response to a search query are necessarily organized into categories, fields, or other labels from a defined organizational scheme. Examples of unstructured data include natural language text documents, audio, video, etc. For example, in a natural language document, such as a word processing document or an e-mail, the text is typically unconstrained by any formal structure or categorical labeling. Any portion of text within the document could be returned in response to a search query, and need not be returned in association with any organizational category or other label. Some unstructured documents may contain some elements having a particular organization (e.g., titles, section headings, etc.), but not all information in the document need be organized. Body text that appears under a particular section heading in a natural language document, although it can be characterized as being part of that particular section of the document, is not considered structured data for purposes of the present disclosure. Similarly, although words within natural language text may be classified as "words" or labeled through natural language processing according to their syntactic or semantic properties such as their parts of speech, sentence structure placement, semantic concept identifiers, etc., this does not make such natural language text "structured data" for purposes of the present disclosure, as such classifications are not part of a predefined scheme for organizing information in the document or set of documents.

It should further be appreciated that in some cases, unstructured data may exist within a structured data source, and likewise structured data may exist within an unstructured data source. For example, an unstructured natural language document such as a web page may include a structured element such as a table within it. In an opposite example, a structured database may include an unstructured element such as a natural language text as an entry within one of the fields of the database. In such cases, whether the data set is treated as a structured or unstructured data source may depend on how search queries to be run on the data set are constructed. If search queries assume that all returnable information items are organized by category, field, or other organizational label, for example, then the data set may be considered a structured data set for purposes of the present disclosure, regardless of whether some unstructured elements may be present within returnable fields. For example, unstructured text within a database field or table cell could be returned in its entirety as a return of the containing field/cell in response to a structured data query; this would not constitute a search of unstructured data. On the other hand, if search queries do not assume that all returnable information items are organized according to a predefined scheme, then the data set may be considered an unstructured data set for purposes of the present disclosure, regardless of whether some structured elements may be present within the document being searched. For example, a search for keywords within natural language text may also search for those keywords within a table contained in the natural language text; this would not constitute a structured data search, as the organizational structure of the table would not be an underlying assumption in the construction of the keyword search query. Similarly, although a web page containing natural language text may have superimposed structural elements such as XML coding for web browser rendering, the document text may still be treated as unstructured data for purposes of the present disclosure.

The inventors have recognized that QA systems may be designed differently depending on what type of knowledge base they utilize. For example, when a QA system uses a structured data source as its knowledge base from which answers to questions are found, the system may be designed to convert users' questions into structured data search queries that utilize the organizational scheme of the structured data source to retrieve information likely to answer the question. For example, given the input question "What is the capital of Liechtenstein?" a QA system whose knowledge base includes a (structured) database table of information about countries could construct a search query that would locate and return the cell in the "capital" column for the row entry for the country Liechtenstein. On the other hand, a QA system that uses an unstructured data source as its knowledge base may be designed to apply textual search queries such as keyword searches to natural language documents to retrieve relevant information to answer the question. For example, a QA system using (unstructured) web pages (e.g., from the Internet) as its knowledge base could construct a search query that would locate and return web pages whose texts include the keywords "capital" and "Liechtenstein," and could analyze the text of the returned documents to find the answer to the question "What is the capital of Liechtenstein?" therein.

The inventors have appreciated that improvements in question answering could be achieved by designing a QA system to make intelligent use of both structured and unstructured data sources in its knowledge base. The inventors have recognized, for example, that many questions posed by human users may not be completely answerable using only structured or only unstructured knowledge bases. Consider, for instance, the question, "When is that movie with Sigourney Weaver and the tall blue aliens playing?" A structured data source such as a movie theater's database could include categorized entries for information items such as actors and showtimes for particular movies, but is unlikely to include information associating the movie "Avatar" with the words "tall blue aliens." On the other hand, an unstructured data source such as a collection of natural language movie reviews may include text descriptions associating "Avatar" with Sigourney Weaver and tall blue aliens, but may not effectively provide the answer being sought, which is the applicable showtimes. The inventors have appreciated that such questions may be effectively answered by a QA system that recognizes different portions of the question as being answerable from different types of knowledge bases (structured and unstructured), and utilizes those different knowledge bases accordingly in answering the question.

Accordingly, some embodiments described herein relate to techniques for question answering, which may address one or more of the above-discussed shortcomings of traditional methods, and/or that may provide one or more of the foregoing benefits. However, aspects of the invention are not limited to any of these benefits, and it should be appreciated that some embodiments may not provide any of the above-discussed benefits and/or may not address any of the above-discussed deficiencies that the inventors have recognized in conventional techniques.

In some embodiments, a user may supply a text input expressing a question in natural language, and a QA system may analyze the text input to identify one or more portions of the question that are answerable from one or more structured data sources, and one or more portions of the question that are answerable from one or more unstructured data sources. Exemplary techniques for performing such analysis are described below. In some embodiments, the QA system may construct and apply appropriate queries to the structured and unstructured data sources, based on the portions of the question identified as being answerable from the respective data sources. This may result in the retrieval of answer information for the different portions of the question from the different data sources. In some embodiments, such answer information from the various data sources may then be merged to form an answer to the user's question, which may then be presented to the user. Exemplary techniques for merging answer information are described below.

In some embodiments, a process of retrieving answer information from an unstructured data source including natural language text documents may be enhanced by performing entailment analysis on candidate text passages to determine which passages best support an answer to the user's question. As described in further detail below, in some embodiments, a user's natural language question expressed in a text input may be mapped to one or more hypotheses, and a candidate text passage may be analyzed to determine whether it entails any of the hypotheses derived from the question. In some embodiments, a passage may be said to entail a hypothesis if the truth of the passage makes the truth of the hypothesis likely. Thus, in some embodiments, as described further below, a passage determined to entail a hypothesis derived from the user's question may be identified as providing supporting evidence for an answer to the question, and may be presented to the user as supporting evidence along with the answer.

Some embodiments apply QA techniques described herein in a product recommendation system. In some embodiments, a user may enter a text input expressing a question asking for a product recommendation, and the system may generate an answer that identifies a product for recommendation to the user. As described further below, in some embodiments this may involve question answering utilizing structured and/or unstructured knowledge bases relevant to providing product recommendations. In some embodiments, a suitable unstructured knowledge base may include product reviews with natural language text evaluations of products, which may be analyzed to determine product recommendation answers and/or to provide supporting evidence for such answers, as described in further detail below. As also described below, some embodiments may alternatively or additionally utilize a structured knowledge base including an ontology with links to natural language product reviews that provide supporting evidence for products as being suitable answers to user questions asking for product recommendations.

It should be appreciated that the foregoing description is by way of example only, and embodiments are not limited to providing any or all of the above-described functionality, although some embodiments may provide some or all of the functionality described herein.

Aspects described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for techniques described herein is for use in a system for question answering. An exemplary operating environment for such a system is illustrated in FIG. 1. The exemplary operating environment includes a question answering (QA) system 100, which may be implemented in any suitable form, as embodiments are not limited in this respect. For example, QA system 100 may be implemented as a single stand-alone machine, or may be implemented by multiple distributed machines that share processing tasks in any suitable manner. QA system 100 may be implemented as one or more computers; an example of a suitable computer is described below. In some embodiments, QA system 100 may include one or more tangible, non-transitory computer-readable storage devices storing processor-executable instructions, and one or more processors that execute the processor-executable instructions to perform functions described herein. The storage devices may be implemented as computer-readable storage media (i.e., tangible, non-transitory computer-readable media) encoded with the processor-executable instructions; examples of suitable computer-readable storage media are discussed below.

As depicted, exemplary QA system 100 includes domain modeler 110, document/passage analyzer 130, user interface 150, question analyzer 160, query builder 170, evidence scorer 180, and answer builder 190. Each of these processing components of QA system 100 may be implemented in software, hardware, or a combination of software and hardware. Components implemented in software may comprise sets of processor-executable instructions that may be executed by the one or more processors of QA system 100 to perform the functionality described herein. Each of domain modeler 110, document/passage analyzer 130, user interface 150, question analyzer 160, query builder 170, evidence scorer 180, and answer builder 190 may be implemented as a separate component of QA system 100 (e.g., implemented by hardware and/or software code that is independent and performs dedicated functions of the component), or any combination of these components may be integrated into a single component or a set of distributed components (e.g., hardware and/or software code that performs two or more of the functions described herein may be integrated, the performance of shared code may be distributed among two or more hardware modules, etc.). In addition, any one of domain modeler 110, document/passage analyzer 130, user interface 150, question analyzer 160, query builder 170, evidence scorer 180, and answer builder 190 may be implemented as a set of multiple software and/or hardware components. Although the example operating environment of FIG. 1 depicts domain modeler 110, document/passage analyzer 130, user interface 150, question analyzer 160, query builder 170, evidence scorer 180, and answer builder 190 implemented together on QA system 100, this is only an example; in other examples, any or all of the components may be implemented on one or more separate machines, or parts of any or all of the components may be implemented across multiple machines in a distributed fashion and/or in various combinations. It should be understood that any such component depicted in FIG. 1 is not limited to any particular software and/or hardware implementation and/or configuration.

In some embodiments, domain modeler 110 may be configured, e.g., via programming instructions executed by one or more processors of QA system 100, to build, maintain, and/or update data modeling the domain of information about which QA system 100 is expected to be knowledgeable. In some embodiments, QA system 100 may be employed to answer questions about a limited (finite) area of real-world knowledge, referred to as the "domain." For example, in some embodiments in which QA system 100 is used to provide product recommendations, the domain may be knowledge about products sold by a particular merchant or set of merchants, or products available in the marketplace of one or more particular types or categories, or products available in the marketplace generally, etc. In another example, QA system 100 may be used to answer questions about entertainment media such as movies, television, etc., and in that case the domain may be knowledge about such entertainment media. It should be appreciated that QA system 100 may be used for question answering in any suitable domain, as embodiments are not limited to any particular domain(s) of knowledge or information. In some embodiments, QA system 100 may be configured to be applicable to multiple domains. Domain modeler 110 may construct and/or maintain separate data models for different domains, each of which may be individually accessed when a question is received pertaining to that domain, or in some embodiments may maintain some central domain-independent model components that may interact with various domain-specific model components for answering questions in particular domains.

In some embodiments, domain modeler 110 may be configured to include or have access to an ontology encoding general human knowledge, which may be domain-independent. As used herein, the term "ontology" refers to any knowledge representation (which may be encoded and/or stored in any suitable data format) that includes representations of known concepts and of known relationships between those concepts. An ontology is often represented graphically as a set of nodes connected to each other by edges, with each node representing a concept and each edge connecting two nodes representing a relationship between the concepts represented by those two nodes. Any concept about which there is human knowledge can be represented as a node in an ontology, and any type of known relationship between concepts can be represented as an edge in an ontology. One type of concept relationship is a parent-child relationship (also referred to herein as a hypernym-hyponym relationship, or an "is-a" relationship), but other types of concept relationships may also be represented in ontologies, as discussed further below. A particular ontology may include multiple types of concept relationships. However, some particular types of ontologies may be more restricted, e.g., to only one type or certain types of concept relationships. For example, one particular type of ontology is a taxonomy, which includes only parent-child relationships. Any type of ontology (including, for example, a taxonomy) may be used with techniques described herein, as some embodiments are not limited to the use of any particular type of ontology.

One or more ontologies for use by QA system 100 may be obtained, constructed, augmented, and/or modified in any suitable way, as embodiments are not limited in this respect. In some embodiments, data for forming an ontology may be obtained from any suitable publicly or commercially available source. One example of such a source is WordNet, a publicly available lexical database that encodes common human knowledge ("a dog is an animal," etc.), and whose data can be organized and stored as an ontology using known techniques. In other embodiments, one or more ontologies may be constructed manually, e.g., by one or more developers of QA system 100, and/or ontology data from one or more publicly or commercially available sources may be modified, augmented, etc., to construct one or more ontologies for use by QA system 100.

Alternatively or additionally, in some embodiments QA system 100 may make use of one or more domain-specific ontologies that encode knowledge in the form of concepts and concept relationships in a particular domain about which QA system 100 may be used to answer questions. In some embodiments, domain modeler 110 may obtain information for constructing and/or updating a domain-specific ontology from one or more domain databases 112, which may include any suitable domain-specific data source(s). For example, in a product recommendation context, domain database(s) 112 may include one or more product databases supplied by manufacturers and/or retailers of the products, containing information such as, e.g., names, brands, model designations, dimensions, features, prices, retail locations, etc., for products available for sale. In the entertainment media domain example, domain database(s) 112 may include one or more databases supplied by media providers and/or media information aggregators, such as listings databases from television services providers, movie theater databases, the Internet Movie Database (IMDb), etc. It should be appreciated that the foregoing are merely examples, and any suitable domain database(s) 112 may be used, as embodiments are not limited in this respect. Domain database(s) 112 may be accessed in any suitable way, such as via any suitable Internet or other network connection(s) to access source sites where such domain databases may be made available. In some embodiments, product merchants or other providers of domain database information may input such database information to QA system 100, and/or may provide updated data at any suitable time(s) to reflect changes in the domain database information.

Figure 2A:
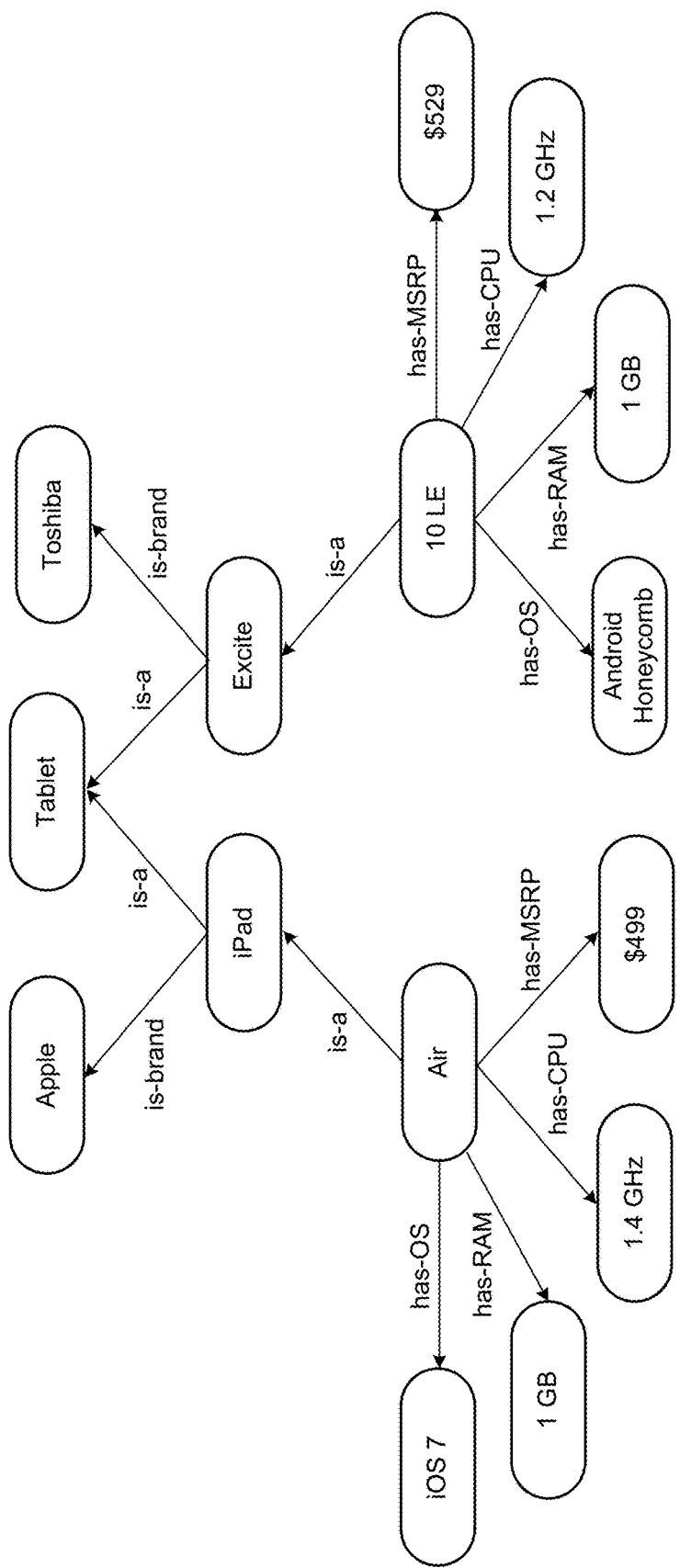
FIGS. 2A and 2B illustrate an exemplary ontology that may be utilized in connection with some embodiments.

In some embodiments, domain modeler 110 may be configured, e.g., via programming instructions executed by one or more processors of QA system 100, to construct a domain-specific ontology using information obtained from a domain database 112. This may be done in any suitable way. In some embodiments, domain modeler 110 may be configured to convert a database table into an ontology structure by mapping individual cells in database rows to ontology nodes (concepts) and mapping the database column labels to ontology edges (relationship types), as illustrated in the following example. FIG. 2A illustrates a very simple ontology structure that could be constructed from the following two rows in a merchant's database table of tablet computers:

| Model | Series | Brand | OS | RAM | CPU | MSRP |
|-------|--------|-------|-----|------|---------|-------|
| Air | iPad | Apple | iOS 7 | 1 GB | 1.4 GHz | $499 |
| 10 LE | Excite | Toshiba | Android Honeycomb | 1 GB | 1.2 GHz | $529 |

Each ovoid shape in FIG. 2A graphically represents a node of the ontology, corresponding to a particular concept. The text inside a node is the tag assigned to the corresponding concept. For example, the node tagged "Tablet" represents the concept of a tablet computer, about which humans have knowledge, such as characteristics of tablet computers, and relationships between tablet computers and other concepts within human knowledge. It should be appreciated, however, that the tag "Tablet" is not the same as the concept itself. The concept of a tablet computer may be called different things by different people in different contexts (e.g., "tablet computer," "tablet PC," "tablet," "slate," etc.), and as such the concept of a tablet is not completely encapsulated by any single word. As used herein, different words or phrases that may be used in speech or text to refer to the same concept are referred to as different "terms" corresponding to the same concept. The concept may represent a semantic meaning that can be expressed in different ways by the different terms. As such, in some embodiments, one or more nodes of an ontology may each be associated with a set of known terms that may be used to refer to the corresponding concept. In some cases, a single term may also correspond to more than one concept, as when a word or word sequence can be used to express more than one semantic meaning (e.g., "tablet" meaning a computer vs. "tablet" meaning a medication pellet). However, when representing ontology concepts in a data structure, it can be helpful to assign a single primary tag to each node, so that the node and its corresponding concept can be referred to and identified from among other nodes and corresponding concepts. In the example data structure of FIG. 2A, a particular concept node has been tagged "Tablet" for convenience; however, it could equivalently have been tagged with a different suitable designation (e.g., a "node ID"), such as a textual designation, a non-text designation such as a number, or some combination of text and non-text designations, unique to that ontology node and its corresponding concept.

Each arrow in FIG. 2A graphically represents an edge in the example ontology, corresponding to a particular relationship between the concepts corresponding to the two nodes connected by the arrow. Any type of concept relationship can be represented in an ontology, e.g., by marking the corresponding edge with a tag representing the type of relationship. For example, in FIG. 5, the "IPAD" node is connected to the "Tablet" node by an arrow tagged "is-a," which represents a parent-child relationship between the concept of tablet computer and the concept of IPAD. A parent-child relationship denotes that the parent concept is a hypernym of the child concept, or equivalently that the child concept is a type of the parent concept. In this case, the "is-a" arrow between "IPAD" and "Tablet" represents the knowledge that the concept of IPAD is a child of the concept of tablet computer (and equivalently, that the concept of tablet computer is a parent of the concept of IPAD), and therefore that an IPAD is a type of tablet computer. The graphical representation of the edge as an arrow indicates that the relationship is directional; i.e., an IPAD is a type of tablet computer, but tablet computer is not a type of IPAD. Although some concept relationships in an ontology may be directional (e.g., unidirectional), not all relationships need be. For example, an ontology could include a synonym relationship between the concepts "Dog" and "Canine," which would be bidirectional (or could potentially be described as nondirectional), to represent the knowledge that "Dog" is another word for "Canine," and "Canine" is also another word for "Dog."

Thus, the edges tagged "is-a" in the example ontology of FIG. 2A represent the following parent-child (also called "hypernym-hyponym") concept relationships:
  An IPAD is a type of tablet computer.
  An IPAD AIR is a type of IPAD.
  An EXCITE is a type of tablet computer.
  An EXCITE 10 LE is a type of EXCITE.

Transitive relationships can also be deduced by tracing connected paths of parent-child relationships within an ontology. For example, "IPAD" is a parent of "AIR " and "Tablet" is a parent of "IPAD," which makes "Tablet" a grandparent of "AIR" (and "AIR" a grandchild of "Tablet"). These relationships represent the knowledge that the AIR is a type of IPAD, and an IPAD is a type of tablet computer, therefore the IPAD AIR is a type of tablet computer. These relationships (e.g., parent-child/hypernym-hyponym relationships) are said to be "hierarchical," since they establish a hierarchy in which parent concepts subsume their children concepts.

In some ontologies, not every concept relationship need be hierarchical. For example, in FIG. 2A, the relationship between "AIR" and "iOS 7" is not hierarchical, as the IPAD AIR is not a type of iOS 7, and iOS 7 is not a type of IPAD AIR. Rather, the relationship between "AIR" and "iOS 7" is represented by an edge tagged "has-OS," which represents a different type of relationship than the "is-a" tag for parent-child relationships. In this example, the "has-OS" relationship represents the relationship between a computer and the operating system (OS) installed on that computer. The "has-OS" relationship between "AIR" and "iOS 7" represents the knowledge that the IPAD AIR has iOS 7 as its operating system. Although the arrow denotes that this particular relationship is directional (the IPAD AIR has iOS 7 as its operating system; iOS 7 does not have the IPAD AIR as its operating system), it is not hierarchical, as explained above. Any suitable types of concept relationships may be defined in an ontology and represented by any suitable edge tags. In addition to "is-a" and "has-OS" relationships, the simple example in FIG. 2A also utilizes the following relationships: "is-brand" (representing the relationship between a product or product series and its brand manufacturer), "has-RAM" (representing the relationship between a computer and the amount of random access memory (RAM) installed on that computer), "has-CPU" (representing the relationship between a computer and the clock speed of its central processing unit (CPU)), and "has-MSRP" (representing the relationship between a product and its manufacturer's suggested retail price (MSRP)).

When used in computer-implemented technology, an ontology may be represented as computer-readable data in any suitable format. For example, in some embodiments, a data representation of an ontology may include a list or table of the concept nodes in the ontology. In some embodiments, each concept node may be designated by a unique node ID (e.g., a number, an alphanumeric sequence or code, or any other suitable form of identifier) included in the list or table. For example, the concepts of the example ontology of FIG. 2A could be represented in a data structure including a table such as the following:

| Node ID | Tag |
|---|---|
| 01 | Tablet |
| 02 | iPad |
| 03 | Excite |
| 04 | Apple |
| 05 | Toshiba |
| 06 | Air |
| 07 | 10 LE |
| 08 | iOS 7 |
| 09 | Android Honeycomb |
| 10 | 1 GB |
| 11 | 1.2 GHz |
| 12 | 1.4 GHz |
| 13 | $499 |
| 14 | $529 |

In some embodiments, the table of concept nodes may include a further column that lists, for each node ID, the known set of terms that may be used to refer to the corresponding concept. For example, this column might include, for node ID 01, the set of terms { "tablet," "tablet computer," "tablet PC," "slate"}, etc. The "Tag" and "Terms" columns are not required, however, and any other suitable columns may be included alternatively or additionally, as embodiments are not limited to the use of ontologies stored in any particular data format.

In some embodiments, a data representation of an ontology may include a table or other type of listing of the concept relationships in the ontology. For example, such a table could include a row for each concept relationship, with the type of relationship and the concept node IDs involved in the relationship listed in the appropriate row. In another example, each relationship type could alternatively or additionally be represented by a relationship ID in place of a textual tag. The directionality of a relationship could be explicitly listed in the appropriate row in the ontology table, or could be implied from the order in which the node IDs involved are listed. Any other suitable columns could be included as well, such as the tags for the corresponding node IDs, and/or any other suitable columns, as embodiments are not limited to the use of ontologies stored in any particular data format. For example, a table of concept relationships could be constructed for the example ontology of FIG. 2A as follows:

| Node ID 1 | Relationship Type | Node ID 2 |
|---|---|---|
| 02 | is-a | 01 |
| 03 | is-a | 01 |
| 02 | is-brand | 04 |
| 03 | is-brand | 05 |
| 06 | is-a | 02 |
| 07 | is-a | 03 |
| 06 | has-OS | 08 |
| 06 | has-RAM | 10 |
| 06 | has-CPU | 12 |
| 06 | has-MSRP | 13 |
| 07 | has-OS | 09 |
| 07 | has-RAM | 10 |
| 07 | has-CPU | 11 |
| 07 | has-MSRP | 14 |

Such a data structure for encoding the information contained in an ontology could be stored in the form of a relational database, or in any other suitable data format. However, it should be appreciated that the foregoing description is provided by way of example only, as embodiments are not limited to the use of ontologies represented, encoded and/or stored in any particular data format.

In some embodiments, as mentioned above, a domain-specific ontology may be constructed from information obtained from a domain database 112, e.g., by converting a domain database table into an ontology structure. This may be done in any suitable way. In some embodiments, as illustrated in the above example, rows and their cells in the database table may be mapped to concepts (nodes) in the ontology structure, and column headings may be mapped to relationship types (edges) in the ontology structure. For instance, in the above example with reference to FIG. 2A, each cell in the two rows of the above merchant's database table of tablet computers is mapped to a concept node in the ontology, tagged with the text from the respective cell in the database table. The concept corresponding to the first cell in each row (the product model) has a relationship in the ontology with the concept corresponding to each other cell in the same row, with the relationship type being defined by the column heading corresponding to the other cell in the database table. For example, the "AIR" concept corresponding to the first cell in the first row in the database table has an "is-brand" relationship in the ontology with the "APPLE" concept corresponding to the third cell in the same row, derived from that third cell's column heading "Brand" in the database table. Concepts and relationships may also be derived from titles of tables; in this example, both database table rows belong to a database table of tablet computers, leading to ontology relationships between the concepts from both rows and the root concept "Tablet." In some embodiments, a domain database 112 that includes multiple different tables may be used to construct multiple ontology structures, which may remain separate or may connected via one or more relationships between concepts from different tables, or between concepts from different tables and one or more root concepts generic to those tables.

In some embodiments, domain modeler 110 may be configured to construct ontology data structures automatically through analysis (e.g., as described above) of the information and data structures in domain databases 112. In other embodiments, any suitable level of human participation may alternatively or additionally be involved. For example, in some situations, there may be ambiguities in how the domain database information should most accurately be incorporated into the ontology, and a human developer may manually enter the ontology data in such situations, and/or may establish rules to direct domain modeler 110 as to how to resolve such ambiguities. For instance, in the example given above in which the "Tablet" title of the database table is used to create ontological relationships between a generic "Tablet" concept and the concepts derived from the rows in the table, domain modeler 110 may not at first have enough real-world knowledge to decide whether to connect the "Tablet" concept to the "Model" concepts (corresponding to the first cells in each table row) or to the "Series" concepts, or to any other of the concepts corresponding to the various table columns. In the example of FIG. 2A, a human expert may direct domain modeler 110 to connect the root "Tablet" concept to the "Series" concepts ("IPAD" and "EXCITE"), based on real-world knowledge that the "Series" concepts are more generic than the "Model" concepts and are all subsumed within the "Tablet" concept. Human direction may also cause the "Brand" concepts ("APPLE" and "TOSHIBA") to be connected to the "Series" concepts rather than the "Model" concepts, for similar reasons. However, such human expert involvement is not required in all embodiments or in all circumstances. In some embodiments, for example, domain modeler 110 may be programmed to make such decisions automatically via default rules, such as by constructing all ontological relationships with the first cell in each database table row (or, equivalently, with a row heading).

In some embodiments, having constructed one or more domain-specific ontologies, domain modeler 110 may cause such ontologies to be stored in structured data sets 120 for use by QA system 100. Alternatively or additionally, in some embodiments domain modeler 110 may cause data (such as database tables) from domain database(s) 112 to be stored in structured data sets 120 with or without accompanying ontological data structures. In some embodiments, domain database(s) 112 may include data already in ontology form, and domain modeler 110 may cause this data to be stored in structured data sets 120 with or without modification. In some embodiments, domain modeler 110 may receive updated information from domain database(s) 112 at any suitable time, and may make updates to corresponding data in structured data set(s) 120 accordingly.

In some embodiments, as discussed above, QA system 100 may utilize one or more domain-independent ontology data structures, whether or not domain-specific data is available. Such ontologies may be stored in structured data sets 120 and/or may reside elsewhere for access by components of QA system 100 such as domain modeler 110. In some embodiments, domain modeler 110 may utilize data from one or more domain-independent ontologies to augment one or more domain-specific ontologies, and/or may generate connections between one or more domain-specific ontologies and one or more domain-independent ontologies, e.g., via suitable concept relationships. For instance, with reference to the tablet computer example above, domain modeler 110 may have access to a domain-independent ontology that includes an "is-a" relationship between the concept "Tablet" and the concept "Computer." Domain modeler 110 may use this known relationship to augment the domain-specific ontology of FIG. 2A by adding a further "Tablet is-a Computer" relationship to the ontology's "Tablet" node. Domain modeler 110 may also augment the "Tablet" concept in the domain-specific ontology with features obtained from the "Tablet" concept in the domain-independent ontology, such as alternative terms for the concept "Tablet," additional relationships with other concepts in the domain-independent ontology, etc. In some embodiments, domain modeler 110 may generate a larger combined ontology by connecting the domain-specific ontology to the domain-independent ontology through one or more concepts common to both ontologies (e.g., the "Tablet" concept) and/or by including one or more relationships known to connect between one or more concepts in the domain-specific ontology and one or more concepts in the domain-independent ontology. Any of these data structures may become part of structured data set(s) 120 in some embodiments, for use by QA system 100 in answering user questions, as described further below.

In some embodiments, as discussed above, QA system 100 may alternatively or additionally make use of one or more unstructured data sources as knowledge bases for question answering. In some embodiments, document/passage analyzer 130 may prepare such unstructured data sources for use by QA system 100. The unstructured data may be accessed by document/passage analyzer 130 (or collected by any other suitable separate system component) from any suitable information sources 132, e.g., via any suitable Internet or other local or network connection(s). Information sources 132 may include public and/or private information sources. For example, in some embodiments, document/passage analyzer 130 may access one or more sets of unstructured documents maintained by an organization, such as a collection of natural language medical reports for use in a healthcare domain. In some embodiments, unstructured documents relevant to a given domain may be accessed and retrieved from any suitable public sources, such as Internet web sites.

The relevance of unstructured documents such as natural language web pages to a given domain may be identified in any suitable way. In some embodiments, the pages of one or more web sites may be designated (e.g., by a human expert) as being relevant to a particular domain (e.g., product review sites such as cnet.com and pcmag.com, product sale sites such as amazon.com and ebay.com, and/or social media sites containing consumer reviews of products may be designated as relevant to a product recommendation domain; film information sites such as imdb.com and rottentomatoes.com, and potentially more general information sites such as wikipedia.org, may be designated as relevant to a movie information domain, etc.). Alternatively or additionally, in some embodiments one or more domain-specific ontologies (e.g., maintained by domain modeler 110) may be accessed by document/passage analyzer 130, which may crawl web pages in search of mentions of concepts that are part of a domain-specific ontology. Such mentions may be detected in any suitable way. For example, in some embodiments, document/passage analyzer 130 may perform word searches on natural language documents for any concept tags and/or known alternative terms or synonyms associated with a concept in a domain-specific ontology, and may mark occurrences of those terms as mentions of the corresponding concept. This is an example of "entity detection." Any suitable entity detection technique(s), including known techniques, may be applied, as embodiments are not limited in this respect. In some embodiments, when a mention of a domain-specific concept is detected in a document, or when enough concept mentions and/or mentions of concepts of enough centrality to the domain are detected as to give the document at least a threshold level of relevance to the domain, the document may be selected and retrieved for inclusion in the knowledge base of QA system 100 for the given domain. Scoring of such relevance levels may be performed and/or thresholded in any suitable way.

In some embodiments, document/passage analyzer 130 may be configured, e.g., through program instructions executed by one or more processors of QA system 100, to analyze natural language texts retrieved from information sources 132 and annotate them to enhance their usefulness in question answering, e.g., in a particular domain. In some embodiments, an index of annotations may be generated for a natural language document, and the indexed document may be stored in indexed unstructured data set(s) 140 in any suitable data format. Such indexing of natural language text documents may be performed in any suitable way. Some embodiments may utilize text indexing techniques disclosed in U.S. patent application Ser. No. 14/485,176, filed on Sep. 12, 2014, and entitled "Text Indexing and Passage Retrieval," which is hereby incorporated herein by reference in its entirety.

For example, in some embodiments, document/passage analyzer 130 may divide natural language texts into units, with each unit having a separate entry and annotations in the document's index. Such units may be defined according to any suitable criteria and may be of any suitable length. In some embodiments, natural language texts may be divided into units of sentences, and each sentence may have its own entry in a document index. In some embodiments, as discussed further below, this may allow text passages to be identified in support of answers to users' questions by combining adjacent sentences individually indexed and determined to provide relevant evidence for the question's answer. As discussed below, in some embodiments, QA system 100 may evaluate the relevance of indexed natural language text to a user's question by searching and/or scoring individual text units corresponding to index entries (e.g., individual sentences) along with their associated annotations in the index.

Any suitable annotations may be applied in indexing natural language text, including any of those described in U.S. patent application Ser. No. 14/485,176, incorporated herein by reference. In some embodiments, document/passage analyzer 130 may annotate mentions of known concepts from one or more domain-specific and/or domain-independent ontologies (e.g., maintained by domain modeler 110), using any suitable entity detection technique(s). In some embodiments, document/passage analyzer 130 may analyze a natural language document to identify text that is part of a document title or section header, as opposed to body text. This may be done in any suitable way, such as by analyzing web page markup code (e.g., XML, HTML markup, etc.) that identifies titles and headers. As another example, any suitable technique disclosed in U.S. patent application Ser. No. 14/485,176, incorporated herein by reference, may be used. In some embodiments, document/passage analyzer 130 may include text from corresponding titles and/or section headings in annotations for index entries (e.g., sentences) belonging to those documents and/or sections. Such annotations may become useful for QA system 100, as discussed further below, to identify a body text passage as being relevant to answering a user's question based in part on the title or header of the document or section in which the passage appears. Any other suitable annotations may alternatively or additionally be included in an index entry (e.g., for an individual sentence) to provide contextual information when the entry is evaluated for relevance to a user's question. For example, in some embodiments, annotations may be included to resolve anaphora, such as a pronoun in one sentence whose antecedent appears in a previous sentence. In such a case, annotating the pronoun with its antecedent (and possibly as a mention of a known ontological concept) may allow QA system 100 to individually evaluate the sentence including the pronoun without overlooking its contextual meaning within the document.

As discussed above, in some embodiments, unstructured documents indexed by document/passage analyzer 130 may be stored in data set(s) 140 for later use in question answering. Alternatively or additionally, in some embodiments some unstructured documents may be stored in data set(s) 140 without indexing, or with only partial indexing performed at the time an unstructured document is received and stored by QA system 100. In some such embodiments, further indexing may be performed when a document is later used in question answering, as discussed further below. In some embodiments, this may allow resources to be conserved, by performing some or all text indexing on documents as they are used in later processing, as opposed to on all documents as they enter the system. In other embodiments, no indexing may be performed on some or all unstructured data stored in data set(s) 140; it should be appreciated that in some embodiments text indexing is not required.

In some embodiments, document/passage analyzer 130 may provide information to domain modeler 110 about unstructured data it has analyzed, or may otherwise incorporate such information in a domain model maintained for QA system 100. For example, in some embodiments, when document/passage analyzer 130 identifies common sections and/or section headings that occur across multiple text documents in a particular domain, this information may be communicated to domain modeler 110, which may store data about the common sections and how they may be useful for question answering in that domain. For example, in some embodiments, when mentions of a particular concept within a domain-specific ontology frequently occur in body text in a particular section common to multiple natural language text documents, or in a particular section heading, domain modeler 110 may attach a pointer to that document section to that concept in the ontology, as an indication that that document section may be relevant for search in answering questions related to that ontological concept. Furthermore, in some embodiments, document/passage analyzer 130 may sometimes encounter structured data when analyzing files from information sources 132 (e.g., a structured table within a web page), and document/passage analyzer 130 may forward such structured data to domain modeler 110 for direct incorporation into structured data set(s) 120. This may include incorporating structured data from information sources 132 into domain-specific and/or domain-independent ontologies, e.g., using techniques such as those described above.

Figure 2B:
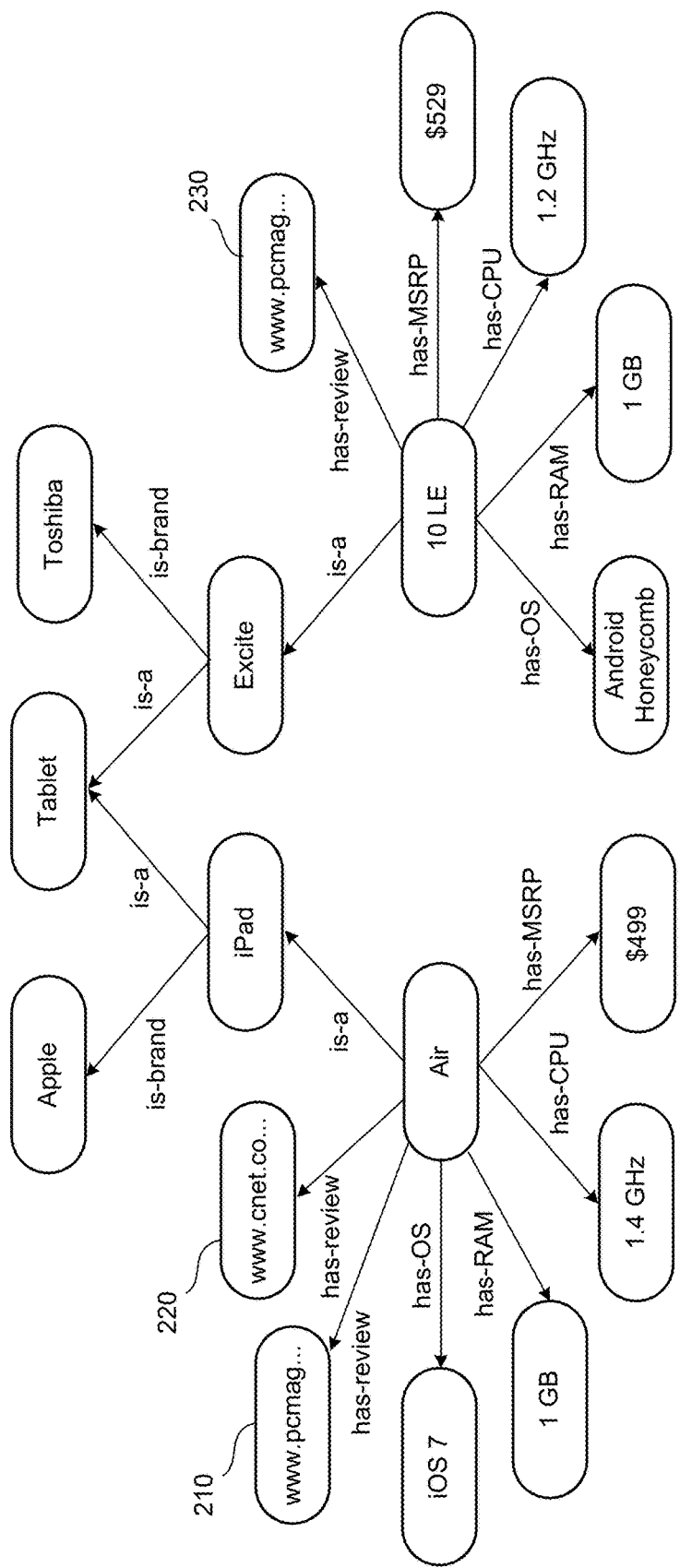

In some embodiments, when document/passage analyzer 130 identifies an unstructured document (e.g., a web page), or a section or passage within a document, as being relevant to a concept within a domain-specific ontology (e.g., by detecting mentions of the concept within the document text), domain modeler 110 may update the ontology to include a pointer to the document, section, or passage linked to the concept. For example, in some product recommendation embodiments, document/passage analyzer 130 may scrape web pages to locate natural language reviews about particular products, and domain modeler 110 may include links to the identified product reviews in the domain-specific ontology. FIG. 2B illustrates an example in which the tablet computer ontology of FIG. 2A has been augmented to include nodes 210, 220, and 230, each representing an available natural language product review linked to a particular product represented as a concept in the ontology. The APPLE IPAD AIR product has links to two reviews in the ontology—one (node 210) from pcmag.com, and one (node 220) from cnet.com. The TOSHIBA EXCITE 10 LE product has a link to a review (node 230) from pcmag.com. In some embodiments, links to such product reviews may be provided in the form of pointers to the reviews' locations within information sources 132, such as URLs for web pages. Alternatively or additionally, in some embodiments linked product reviews may be stored as documents accessible locally to QA system 100, such as in data set(s) 140.

In some embodiments, product reviews identified for use by QA system 100 may include evaluations made based on use of the product by an author of the review. Such product reviews may include, for example, customer reviews and/or expert reviews. Customer reviews may include evaluations of products made by purchasers of the products. Such customer reviews may typically be found, for example, on product sale web sites such as amazon.com and ebay.com in connection with pages listing the corresponding products for sale. Expert reviews may include, for example, product reviews on web sites dedicated to evaluating and providing consumer information on new and/or existing products, such as consumerreports.org, cnet.com, pcmag.com, etc. Such customer and/or expert product reviews are to be distinguished from, for example, official product descriptions or marketing blurbs provided or sponsored by manufacturers or retailers of the products. Some embodiments, however, may make use of either or both types of product descriptions.

Unstructured data set(s) 140, like structured data set(s) 120, may be updated and/or modified at any suitable time, such as when document/passage analyzer 130 accesses new or updated text documents or other unstructured data from information sources 132.

In some embodiments, a user 152 may interact with QA system 100 via user interface 150, which may be implemented in any suitable way. In some embodiments, user 152 may operate user interface 150 to input a question for QA system 100 to answer. The question may be input as part of a dialog, in some circumstances. In some cases, the question may be expressed in natural language. Examples of natural language questions include, "When is that movie with Sigourney Weaver and the tall blue aliens playing?" and, "What is a tablet computer that costs less than $600 and has a slim design?" etc. It should be appreciated, however, that a "question" as the term is used herein need not necessarily be grammatically phrased strictly as a question (e.g., with an interrogative pronoun and a question mark). Other sentence/phrase forms, such as imperative and declarative forms and sentence fragments, may be interpreted by QA system 100 as questions, as long as they seek an answer to the question. For example, user inputs such as "Show me when that movie with Sigourney Weaver and the tall blue aliens is playing" (imperative), "I need a tablet computer that costs less than $600 and has a slim design" (declarative), and "Tablet computer less than $600 with slim design" (fragment) may all be considered questions for purposes of the present disclosure. User 152 may provide input expressing a question to user interface 150 in any suitable form, including textual and/or audio forms. For example, user 152 may provide a text input expressing a question directly in textual form using any suitable textual input system component, such as a keyboard or touchscreen. In another example, user 152 may input a question in spoken audio form using, e.g., a microphone and automatic speech recognition software. Thus, in some embodiments, QA system 100 receiving a text input from user 152 may involve receiving the input in another form and converting it to text. In some embodiments, a user's question input via user interface 150 may be processed by question analyzer 160, which may be configured, e.g., through program instructions executed by one or more processors of QA system 100, to parse and/or annotate the question in such a way as to facilitate further processing by QA system 100 to answer the question. In some embodiments, question analyzer 160 may perform entity detection (exemplary entity detection techniques are discussed above) to annotate mentions in the question of known concepts from the domain-specific and/or domain-independent ontologies maintained by domain modeler 110. In some embodiments, question analyzer 160 may further augment such annotations with relevant known relationships to other concepts in the applicable ontology. For example, the question, "When is that movie with Sigourney Weaver and the tall blue aliens playing?" could be annotated with the concept IDs of "movie" and "Sigourney Weaver" from a domain-specific ontology in a film domain, and also with the relationship "Sigourney Weaver is-a actor" found in the ontology. The question could also be annotated with concept IDs from one or more domain-independent ontologies, such as concept IDs for the terms "movie," "tall," "blue," "aliens," and "playing." The domain model may further include information indicating that the mentions "movie" and "playing" occurring together implicate a concept of "showtime," which could also be the subject of an annotation for the question.

In some embodiments, question analyzer 160 may be configured to parse the user's question using any suitable parsing technique(s), such as a known dependency parser (one example is the Clear NLP parser developed at Emory University, available at clearnlp.com), to identify the syntactic and/or semantic relations between words in the question. In some embodiments, question analyzer 160 may employ such parsing, annotation, and/or other suitable analysis to identify from the user's question a broadest characterization of the answer being sought (referred to herein as the "intent" of the question) along with any limiting constraints on what answer will satisfy the question. For example, the intent of the question "When is that movie with Sigourney Weaver and the tall blue aliens playing?" could be expressed as, "When is movie X playing?" Further, the annotation of the combination of "movie" and "playing" with the concept "showtime" could allow the intent to be identified as a request for showtimes for movie X. Constraints on the answer identifiable from the parse and annotations of the question include "movie X has actor Sigourney Weaver" and "movie X has tall blue aliens."

In some embodiments, question analyzer 160 may be configured to determine and identify which portions of the user's question are answerable from the available structured knowledge base, and which portions are better answerable from an unstructured knowledge base. This may be done in any suitable way. In some embodiments, question analyzer 160 may identify portions of a user's question that are answerable from a structured data source by identifying concepts and relations (e.g., constraint and/or intent relations) that map to the domain model corresponding to the structured data source. For example, the portion of the above question corresponding to the constraint "movie X has actor Sigourney Weaver" may be identified as answerable from a structured domain-specific ontology if the ontology contains the concept "Sigourney Weaver" (e.g., as determined from a concept ID annotation applied to the mention of "Sigourney Weaver" in the question as described above) and a "has-actor" concept relationship type that connects movie concepts (e.g., concepts having "is-a" relationships with the concept "movie") with the "Sigourney Weaver" concept. In another example, the same question constraint could be identified as being answerable from a structured database table of movies that includes one or more "actor" columns having "Sigourney Weaver" entries in some of the rows.

In some embodiments, one or more portions of an analyzed question identified as being answerable from available structured data may be submitted to query builder 170. Query builder 170 may be configured, e.g., through program instructions executed by one or more processors of QA system 100, to construct one or more search queries to apply to structured data set(s) 120 based on the annotated question, and/or based on one or more relations, assertions, or other suitable representations (e.g., intent and/or constraint relations) of search criteria derived from analysis of the question. In some embodiments, query builder 170 may construct each search query in a format conforming to the data structure to be searched, such as a SQL query for searching a SQL database. For example, the constraint "movie X has actor Sigourney Weaver" could be the basis for a database search query constructed to search the above-described table of movies and return all rows that contain "Sigourney Weaver" in an "actor" column. Or, if the structured data set to be searched is the domain-specific ontology described above, the search query could be constructed to return all concept nodes having both an "is-a" relationship with the concept "movie" and a "has-actor" relationship with the concept "Sigourney Weaver." (As discussed above, in some cases an ontology may in fact be stored in the form of a database, such that an ontology search query itself may be formatted as an appropriate database search query.)

In some embodiments, query builder 170 may apply the search queries it constructs to the appropriate structured data set(s) 120, and the retrieved answer information may be passed to answer builder 190, discussed further below. For instance, continuing the above example, the one or more search queries corresponding to the "movie X has actor Sigourney Weaver" constraint, when applied to structured data set(s) 120 (including, e.g., one or more domain-specific movie ontologies, database tables, etc.), may result in the return of a list of movies in which Sigourney Weaver acted, which may be passed as answer information to answer builder 190.

In some embodiments, question analyzer 160 may also identify one or more portions of the user's question as better answerable from one or more unstructured data sources. In some embodiments, these portions may correspond to any portions of the question that are not identified as being answerable from the available structured data sources. For example, the constraint "movie X has tall blue aliens" may be identified as better answerable from an unstructured data source if there are no domain-specific concept nodes (e.g., in the film ontology) corresponding to "tall blue aliens," or no database table columns or cell entries corresponding to "tall blue aliens." However, in some embodiments, or in some domains or circumstances, this may not be required. In some embodiments, if all portions of the question are identified as being answerable from structured data sources, then no portions may be submitted to any unstructured data sources. However, in other embodiments, some or all portions of a question that are identified as being answerable from structured data sources may also be identified as being answerable from unstructured data sources, e.g., to collect further evidence for the answer information retrieved from the structured data sources, and/or to test whether enhancing or conflicting answer information may be retrieved from the unstructured data sources. In some cases, portions of a question answerable from structured and unstructured data sources may overlap, such that one or more terms/concepts in the question participate in both forms of search. In some embodiments, relevant unstructured data sources may not be available for a particular question or domain, in which case the question may be answered as closely as possible using only structured data sources. Similarly, some embodiments, domains or circumstances may not make use of structured data sources, and may answer questions utilizing only unstructured data sources, e.g., according to techniques discussed further below.

In some embodiments, question analyzer 160 may submit to query builder 170 analyzed portions of the user's question identified as being answerable from unstructured data sources. Query builder 170 may then construct, from those portions, one or more search queries in a format suitable for searching and retrieving relevant unstructured data such as natural language text documents and/or passages. This may be done in any suitable way. Some embodiments, for example, may utilize any of the passage retrieval techniques disclosed in U.S. patent application Ser. No. 14/485,176, incorporated herein by reference.

In some exemplary embodiments, query builder 170 may construct a search query for unstructured data set(s) 140 using terms that appear in the user's question and/or in annotations to the question supplied by question analyzer 160. For example, the question constraint "movie X has tall blue aliens" could form the basis for a text keyword search query for natural language documents relevant to the film domain that contain the terms "tall," "blue" and "aliens," and/or any alternative terms (e.g., synonyms) for those concepts, e.g., as supplied by annotations from the domain model (e.g., ontology). As discussed above, in some embodiments, unstructured documents in data set(s) 140 may also be annotated with concept IDs, such that retrieving documents and/or passages relevant to the user's question may in some cases involve matching concept annotations from the analyzed question with concept annotations from the indexed documents. In some embodiments, the relevance of different documents to the search query may be scored in any suitable way, such as by considering how many terms and/or concepts from the search query are matched in a particular document, the degree of proximity among matching terms and/or concepts within a particular document, the number of search queries corresponding to different constraints of the question that are matched in the same document, etc. In some embodiments in which unstructured documents are indexed in units such as individual natural language sentences, as discussed above, individual indexed units (e.g., document sentences) may be scored for relevance to the search query, and high-scoring units may be retrieved individually for further analysis. In some such embodiments, as discussed above, annotation of index units (e.g., body text sentences) with text from corresponding section headings and document titles may increase the relevance score of a passage by simulating proximity to terms that appear in the heading and/or title to which that passage belongs. In some embodiments, as discussed above, the domain model may include information indicating which common document sections are typically relevant for particular concepts, and this information may be utilized in any suitable way, such as to constrain the search to the identified document sections, or to increase the relevance scores of passages in those sections. In some embodiments, passages may be identified and delineated by combining adjacent sentences which are indexed individually, and the relevance score of the passage as a whole may be computed by combining the relevance scores of the sentences it spans.

In some embodiments, the result of applying one or more search queries constructed by query builder 170 to unstructured data set(s) 140 may be a set of documents and/or passages identified as relevant to a search query and passed to evidence scorer 180. The set of returned documents/passages may be thresholded for relevance in any suitable way, such as by retrieving only documents/passages having relevance scores above a suitably determined threshold, or by retrieving the N-best-scoring documents/passages for any suitably defined value of N. In some embodiments, evidence scorer 180 may be configured, e.g., through program instructions executed by one or more processors of QA system 100, to extract answer information from the retrieved documents/passages and, in some embodiments, to evaluate the retrieved passages in terms of the strength of supporting evidence that they provide for the extracted answer information as contributing to the best answer to the user's question.

Evidence scorer 180 may extract answer information from retrieved relevant documents/passages in any suitable way. In some embodiments, evidence scorer 180 may use concept ID and/or semantic parser annotations from retrieved indexed passages, together with any domain model knowledge about the particular relevance of corresponding section headers, document titles, etc., to extract one or more assertions from a passage to match one or more intent and/or constraint relations from the user's question. For instance, in the above example in which the question constraint "movie X has tall blue aliens" is used to query unstructured data set(s) 140, one exemplary natural language text passage that may be returned is the following, from the "Plot" section of the page at wikipedia.org titled "Avatar (2009 film)":

Pandora, whose atmosphere is poisonous to humans, is inhabited by the Na'vi, 10-foot tall (3.0 m), blue-skinned, sapient humanoids who live in harmony with nature and worship a mother goddess called Eywa.

In this example passage, the keywords "tall," "blue," and "humanoids," may have been annotated with concept IDs corresponding to those of the search terms "tall," "blue," and "aliens," respectively. Furthermore, the domain model may specify that "Plot" sections of Wikipedia articles with the word "film" in the title tend to contain text relevant to descriptions of movies, and that the document title of such articles tends to contain the title of the movie to which the article relates. From this information, evidence scorer 180 may extract the assertion, "Avatar has tall blue aliens," as being made by the passage. This assertion matches the question constraint "movie X has tall blue aliens" with a specific concept ("Avatar") replacing the generic/unknown concept ("movie X") in the constraint, such that the assertion provides candidate answer information for the question constraint.

In some embodiments, evidence scorer 180 may evaluate passages in terms of the strength of the evidence they provide in support of the extracted answer information as contributing to accurately answering the user's question. This may be done in any suitable way. Some embodiments may utilize entailment and/or contradiction detection techniques such as those disclosed in U.S. Pat. No. 7,313,515, issued on Dec. 25, 2007, and entitled "Systems and Methods for Detecting Entailment and Contradiction," which is hereby incorporated herein by reference in its entirety.

For example, in some embodiments, evidence scorer 180 (or any other suitable component of QA system 100, such as question analyzer 160 or query builder 170) may map the user's question to one or more hypotheses to be tested for entailment against one or more assertions extracted from natural language text passages. This may be done in any suitable way. In some embodiments, a hypothesis may be formed by converting a question or question intent/constraint relation into a declarative sentence with the unknown terms such as interrogative pronouns and variable placeholders being replaced by indefinite pronouns, determiners, etc. For example, the question constraint, "movie X has tall blue aliens," could be converted to the hypothesis, "Some movie has tall blue aliens;" the question, "Who is president of the United States?" could be converted to the hypothesis, "Someone is president of the United States," etc.

In some embodiments, the strength of a passage's supporting evidence for answer information for a question portion may be evaluated by determining whether the passage entails a hypothesis corresponding to the question portion. This may be true if an assertion made by the passage entails the hypothesis. Entailment is a logical relation in which the truth of one statement (e.g., the question hypothesis) logically follows if the other statement (e.g., the passage assertion) is true. For example, if the passage assertion "Avatar has tall blue aliens" is true, then the question constraint hypothesis "Some movie has tall blue aliens" is also true; thus, this passage from the Wikipedia article about Avatar entails the hypothesis and provides supporting evidence for Avatar as answer information for the "movie with tall blue aliens" question constraint.

In some embodiments, evidence scorer 180 may perform entailment analysis on retrieved passages, and may reject any passages that do not entail a question hypothesis. For example, a passage about a different film that states, "You won't find any tall blue aliens in this movie," may have been retrieved as being highly relevant to the search query because it contains many of the search keywords, but it would not entail the question constraint hypothesis, and it would not provide strong support for the other film as being the answer to the user's question. Alternatively or additionally, in some embodiments, evidence scorer 180 may score passages based at least in part on the degree to which they entail one or more question hypotheses, and may rank passages based on their scores. In some embodiments, evidence scorer 180 may disregard passages that score below a suitably defined threshold, or may retain only the N-best-scoring passages for any suitably defined value of N, or may prune low-scoring passages according to any other suitable criteria.

In some embodiments, an entailment/contradiction score computed as described above and/or utilizing techniques described in U.S. Pat. No. 7,313,515, incorporated herein by reference, may be used as one feature input to a statistical classifier used to score the strength of a passage's supporting evidence for an answer item. Any other suitable features may be used in such a classifier, in addition to or instead of the above entailment/contradiction score feature, some non-limiting examples of which may include:

Term matching features: Features that count the number of matches between terms in the passage and the hypothesis. There may be different variations counting the matches between the string, lemma and part of speech (POS) forms of the words.

String Term Matcher: Scorer that counts the number of surface form matches between the passage text and the hypothesis.

Lemma Term Matcher: Scorer that counts the number of lemma form matches between the passage text and the hypothesis.

POS Term Matcher: Scorer that counts the number of POS tag matches between the passage text and the hypothesis.

Max Match Aggregator: Computes the best match between the terms in the passage and the hypothesis based on the term matchers above. This may then be used by the path matchers below.

Brown Clustering: Computes the distance between all the terms in the passage and the hypothesis based on the Brown clustering approach for entity recognition. Exact match is 0 and no match is 1.

Surface features: Some embodiments may use two types of skip bi-gram features, the first type based on the string structure of the text, and the second type based on the dependency parse structure of the text. There may be two variations of each type, one with exact string match between the terms and the other with lemma match.

Skip Bigram Term String Scorer: Computes the surface form skip-bigrams taking into account the order in which the words appear in the sentence. Its score is normalized within [0, 1] based on the maximum number of bigrams that may be found given the hypothesis text.

Skip Bigram Term Lemma Scorer: Similar to the Skip Bigram Term String Scorer, but computes the lemma-based skip-bigrams taking into account the order in which the words appear in the sentence. Its score is normalized within [0, 1] based on the maximum number of bigrams that may be found given the hypothesis text.

Skip Bigram Dependency String Scorer: Works on the dependency graph structure that is obtained from the parsing of both the hypothesis and the passage. Computes the skip bigrams using the surface form of the words, following the dependency path between them. Its score is normalized within [0, 1] based on the maximum number of bigrams that may be found given the hypothesis text.

Skip Bigram Dependency Lemma Scorer: Similar to the Skip Bigram Dependency String Scorer, but uses the lemma forms of the words to compute the skip bigrams following the dependency path between them. Its score is normalized within [0, 1] based on the maximum number of bigrams that may be found given the hypothesis text.

Path matching features: These features work on the dependency path structure to account for semantic relations such as contradiction, entailment, and role matches.

Dependency Relation Matcher: Tests how many term-relation-term matches there are between the hypothesis and the passage. The term matches may be based on MaxMatch, and the relation may be based on the syntactic dependency link.

Dependency Path Matcher: Extends the Dependency Relation Matcher to determine how many variable-length paths match between the hypothesis and the passage. For example, if there is a term-relation-term-relation-term-relation-term in the passage, but only a term-relation-term in the hypothesis, this matcher may determine how well the two match.

Semantic Relation Matcher: Similar to the Dependency Relation Matcher, but tests how many semantic relation matches there are between the hypothesis and the passage.

Brown Clustering PredArg Matcher: Returns an average of the distance among the terms in a semantic relation match. For example, if there is an exact match between the first arguments of a relation (0) but no match between the second (1), the relation's score may be 0.5.

Simple Contradiction Scorer: Searches for simple contradiction semantic relations (e.g., from a dependency parser) and counts to see if there are mismatches between the hypothesis and the passage. For example, if there is 1 negation in the hypothesis and 0 in the passage, the score would be 1. If there is 1 negation in both the hypothesis and the passage, then the score would be 0.

Simple Entailment Scorer: Searches for semantic relations shared by the hypothesis and the passage.

Simple Entailment Judge: Considers whether the Simple Contradiction Scorer or the Simple Entailment Scorer has fired. If the contradiction scorer fires, the entailment judge may mark the passage as "contradiction;" if the entailment scorer fires, the entailment judge may mark the passage as "entailment." Otherwise, it may be neutral.

Any, all, or none of the above exemplary classifier features may be used in some embodiments, as embodiments are not limited to the use of any particular set of features. It should also be appreciated that the foregoing are merely some examples, and others are possible.

Any other suitable factors may alternatively or additionally be used by evidence scorer 180 to score and/or rank passages according to the strength of their supporting evidence for answer information. For example, in some embodiments, passages and/or documents may be scored and/or ranked based at least in part on how many hypotheses derived from the question are entailed by the same passage/document. For instance, the other question constraint, "movie X has actor Sigourney Weaver," could also be converted to the hypothesis, "Some movie has actor Sigourney Weaver," which could also be compared against assertions extracted from the same Wikipedia article about the movie Avatar. In this case, there is a relevant passage in the "Cast" section of the document:

Sigourney Weaver as Dr. Grace Augustine, an exobiologist and head of the Avatar Program.

From this passage (and its "Cast" section heading and "Avatar (2009 film)" document title) may be extracted the assertion that "Avatar has actor Sigourney Weaver," which entails the question constraint hypothesis. In this case, the fact that the same document contains passages entailing both question constraint hypotheses may increase the supporting evidence score of the document and its passages corresponding to the answer information. In some embodiments, if multiple different answer items are extracted from different documents/passages for the same question relation (e.g., constraint), then the answer items themselves may also be scored to determine which best answers the question relation. In some embodiments, answer items may be scored based on the evidence scores (e.g., entailment confidence levels) of their respective supporting passages. In some embodiments, the score of an answer item may depend at least in part on how many different passages or documents support that answer item.

In some embodiments, answer items generated by evidence scorer 180 from unstructured data may be passed to answer builder 190 for building a complete answer to the user's question. In some embodiments, one or more supporting natural language text passages for one or more answer items (e.g., the top-scoring passage for an answer item, a ranked list of a suitable number of top-scoring passages for the same answer item, etc.) may also be provided to answer builder 190. In some embodiments, answer builder 190 may be configured, e.g., through program instructions executed by one or more processors of QA system 100, to merge any answer information retrieved from structured data search and any answer information generated from unstructured data to build a combined answer to present to user 152 in response to the user's question. This may be done in any suitable way, examples of which are described below.

In some embodiments, answer information retrieved from structured data search and answer information derived from analysis of unstructured data may be compared to identify any common answer information that satisfies the intent and/or constraints of the user's question. In the example in which the structured data search returns a list of movies in which Sigourney Weaver is an actor and the unstructured data analysis identifies movies involving tall blue aliens, both sets of answer information may be compared to determine which answer items overlap. In this case, the movie Avatar may be identified as the answer item best meeting both question constraints of "movie having actor Sigourney Weaver" and "movie involving tall blue aliens."

In some embodiments, searches and analyses of structured and unstructured data may be performed in parallel, and answer builder 190 may merge the returned answer information after such searches and analyses have been performed. However, in some embodiments and/or circumstances, searches of structured and unstructured data may be performed more serially, with the results of one search being retrieved before performing another search, in which case the results of the first search may be used to constrain the second search. For example, in some embodiments, one or more structured data searches may be performed first, and answer information returned from the structured data search(es) may be used to constrain one or more search queries applied to the unstructured data sources, e.g., by including additional search terms derived from the structured data answer information. For instance, continuing the example from above, the structured search query returning a list of Sigourney Weaver movies could be run first, and then those movie titles could be included in the search query for relevant unstructured documents pertaining to those particular movies and descriptions involving tall blue aliens. In some embodiments, performing such a serial search may focus the search of unstructured data and reduce the number of documents to be analyzed. Also, in some embodiments, an unstructured data search may be performed using answer information from a previous structured data search even if the structured data search already fully answers the user's question. The subsequent unstructured data search may be performed, in some embodiments, to collect supporting evidence for the answer in the form of natural language passages. Similarly, in some embodiments or circumstances, searches may be performed serially the other way around, with answer information extracted first from unstructured data and used to constrain the structured data search. In some embodiments, query builder 170 (or any other suitable component of QA system 100, such as question analyzer 160) may be configured to make determinations regarding which type of search to perform first, based, for example, on the relative number of question constraints that can be resolved by each type of search. For example, if the user's question were, "Who directed that movie with the tall blue aliens?" query builder 170 might determine that the most defined question constraint ("movie X has tall blue aliens") is answerable from unstructured data, and may run the unstructured data query first to identify movies involving tall blue aliens. These answer items may then be used to constrain a structured data search to address the question intent ("Who directed movie X?") by searching for the entry in the "director" field for any of the movies identified in the unstructured data search. In some embodiments, multiple sequential searches may be interleaved, such as a structured data search that constrains a following unstructured data search, whose results then constrain a further structured data search, in any suitable fashion to accurately and/or efficiently retrieve answer information for a user's question.

In some embodiments, queries may be performed and answer information may be retrieved until answer information has been found that addresses the intent identified from the user's question. For instance, in the running example above, the answer information identifying Avatar as a movie involving tall blue aliens and having Sigourney Weaver as an actor satisfies the two constraints identified from the question, but does not satisfy the question intent, which is "What are the showtimes for movie X?" where movie X can now be identified as Avatar. Thus, in this example, a further structured data search may be performed using the answer information returned from the previous searches and analyses, to return showtimes listed for the movie Avatar in a database of showtimes.

In some embodiments, answer builder 190 may construct a direct answer to the user's question (e.g., an answer directed to the intent of the question) by merging the best answer information directed to each constraint and the intent of the question, whether such answer information is derived from structured data sources, unstructured data sources, or both. Answer builder 190 may then present the answer to user 152 via user interface 150 in any suitable way, such as in textual form on a visual display, in audio form by automatic speech synthesis, etc. In some embodiments, answer builder 190 may compose the answer in natural language, e.g., in a sentence such as, "Today's showtimes for Avatar are:" followed by a list of the identified showtimes. However, this is not required. In other embodiments, the answer may be presented in any suitable form, such as by simply displaying "Avatar:" and the list of showtimes.

In some embodiments, answer builder 190 may also present to user 152, via user interface 150, one or more of the best passages identified by evidence scorer 180 as providing supporting evidence for the answer being presented. For example, the answer providing showtimes for Avatar may be supported by one or more of the passages quoted above, providing evidence that Avatar is the movie about which the user's question was asking (involving tall blue aliens and Sigourney Weaver). In some embodiments, supporting passages may be presented to user 152 along with links to the full documents (e.g., web pages) from which they were excised, in case the user would like to see the rest of the content of those supporting documents. In some embodiments, user interface 150 may provide an option for user 152 to request further supporting evidence, in response to which additional passages providing support for the answer (e.g., passages not previously selected for presentation because their strength of evidence scored lower than those selected for presentation) may be displayed. When multiple supporting passages are provided to user 152, in some embodiments they may be ordered within user interface 150 based on a ranking determined by their scores computed by evidence scorer 180.

In some embodiments or circumstances, instead of a single answer to the user's question, multiple candidate answers may be displayed. This may be appropriate, for example, when there are multiple answers that satisfy the intent and constraints of the user's question, or when no answer can be found that satisfies the intent and all constraints of the user's question, in which case a number of alternative candidate answers may be presented that each satisfy some of the constraints. FIG. 3A illustrates a partial example of a user interface display in such a case in which multiple candidate answers are presented to a user's question. In this example, the user has input a question asking for a product recommendation: "Show me a tablet under $600 with a slim design." In this example, question analyzer 160 has identified the question portion (constraint) "tablet under $600" as being answerable from a structured data source as identified by domain modeler 110—namely the domain-specific ontology partially illustrated in FIG. 2B—and the question portion (constraint) "tablet with a slim design" as better answerable from unstructured data sources. Query builder 170 has constructed an appropriate search query for structured data set(s) 120 (including the domain-specific ontology), which has returned the APPLE IPAD AIR and the TOSHIBA EXCITE 10 LE as tablet computer products matching the constraint of having an MSRP of less than $600. Query builder 170 has further utilized links 210, 220 and 230 connected to the APPLE IPAD AIR and TOSHIBA EXCITE 10 LE concepts in the ontology to retrieve (un-structured) natural language product reviews previously identified as being relevant to those products identified as answer information from the structured data search. Query builder 170 has applied one or more search queries to those documents to retrieve passages relevant to the "slim design" constraint, and evidence scorer 180 has evaluated those passages for the strength of their supporting evidence for the identified products as being good answers to the "slim design" constraint. Answer builder 190 has then presented via user interface 150 each answer (in this case, the answer being in the form of the product name (brand, series, and model) and price) along with the best identified supporting passages from corresponding product reviews (two supporting passages for the APPLE IPAD AIR, and one supporting passage for the TOSHIBA EXCITE 10 LE). In some embodiments, selecting one of the supporting passages within the user interface may allow the user to view the full document (e.g., the full product review and/or the web page from which it was retrieved) corresponding to that passage.

Figure 3B:
Figure 3B:

In some embodiments, a question answering interface such as a product recommendation interface may allow the user to modify a question after initial answers are presented, e.g., by inputting additional constraints to narrow down the candidate answers. FIG. 3B illustrates an example in which, after viewing the candidate answers in FIG. 3A, the user has input an additional constraint: "I want an ANDROID OS." In response, QA system 100 has processed the additional "ANDROID OS" constraint, identified it as answerable from the structured data source, traced the "has-OS" relationships connected in the domain-specific ontology to the product concepts corresponding to the previously presented answers, and eliminated the APPLE IPAD AIR candidate answer as not meeting the constraint of having an ANDROID OS. Thus, in FIG. 3B, only the TOSHIBA EXCITE 10 LE answer is now presented as meeting all of the constraints of the user's product recommendation question. In the example of FIG. 3B, selectable checkboxes by each of the input constraints may allow the user to also remove constraints as desired, to increase the number of candidate product answers provided.

In some embodiments, QA system 100 may have specialized criteria for ranking candidate answers according to particular domains. In a product recommendation domain, for example, options for ranking criteria may include ranking answers based on numerical ratings in supporting product reviews, numbers of supporting product reviews, user-designated preferences such as prioritizing price over ratings, product availability at retailers local to the user's location, etc. It should be appreciated, however, that these are merely examples, and any suitable ranking criteria, including no such criteria in some cases, may be employed in some embodiments.

Figure 4:
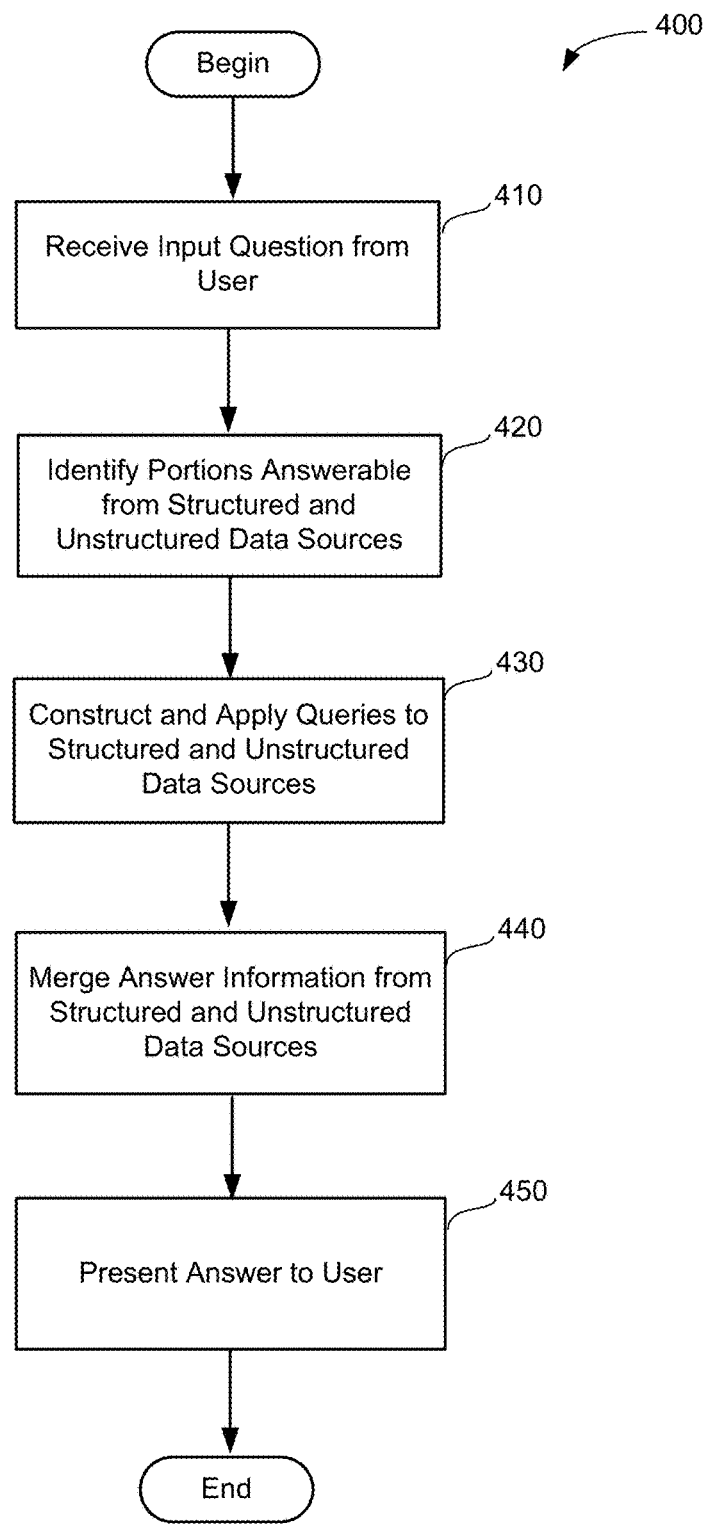
FIG. 4 is a flowchart of an exemplary method for question answering in accordance with some embodiments.

It should be appreciated from the foregoing that one embodiment is directed to a method 400 for question answering, as illustrated in FIG. 4. Method 400 may be performed, for example, by one or more components of a question answering system such as question analyzer 160 and/or query builder 170, although other implementations are possible and method 400 is not limited in this respect. Method 400 begins at act 410, at which an input question may be received from a user. In some embodiments, this may be a text input expressing the question in natural language. As discussed above, the received text input may be provided by the user directly in textual form, or in another form that is converted to text.

At act 420, the text input may be analyzed, including identifying in the question one or more first portions answerable from one or more structured data sources, and one or more second portions answerable from one or more unstructured data sources. As discussed above, in some embodiments, the structured data source(s) may include one or more databases, and in some embodiments, the unstructured data source(s) may include one or more sets of documents containing natural language text. In some embodiments, one or more of the documents may be analyzed, such as by applying any of the text indexing techniques described above. For example, in some embodiments, one or more sections in a document may be identified as being relevant to one or more classification categories (e.g., database column concepts or labels or field labels) appearing in a structured data source, and an annotation may be generated identifying the document section as being relevant to the classification category.

At act 430, one or more first queries may be constructed from the first question portion(s) answerable from the structured data source(s), and may be applied to the structured data source(s) to retrieve first answer information for the first question portion(s) Likewise, one or more second queries may be constructed from the second question portion(s) answerable from the unstructured data source(s), and may be applied to the unstructured data source(s) to retrieve second answer information for the second question portion(s). In some embodiments, applying an unstructured data query to natural language text documents may involve applying the query at least partly to annotations applied to the documents as discussed above. Also as discussed above, in some cases, the different queries may be applied in parallel; while in other cases, queries may be applied sequentially, and results of a previous query may be used in a subsequent query. For example, in some circumstances, answer information retrieved from a structured data query may be used to constrain a query applied to the unstructured data source(s).

At act 440, answer information from the structured and unstructured data sources may be merged to form an answer to the user's question, and this answer may be presented to the user at act 450. In some embodiments, as discussed above, one or more portions of natural language text from the unstructured data source(s) may be identified as providing evidence that supports answer information retrieved from the unstructured data source(s), and this natural language text (e.g., one or more supporting passages) may be presented to the user in association with the generated answer to the user's question.

Figure 5:
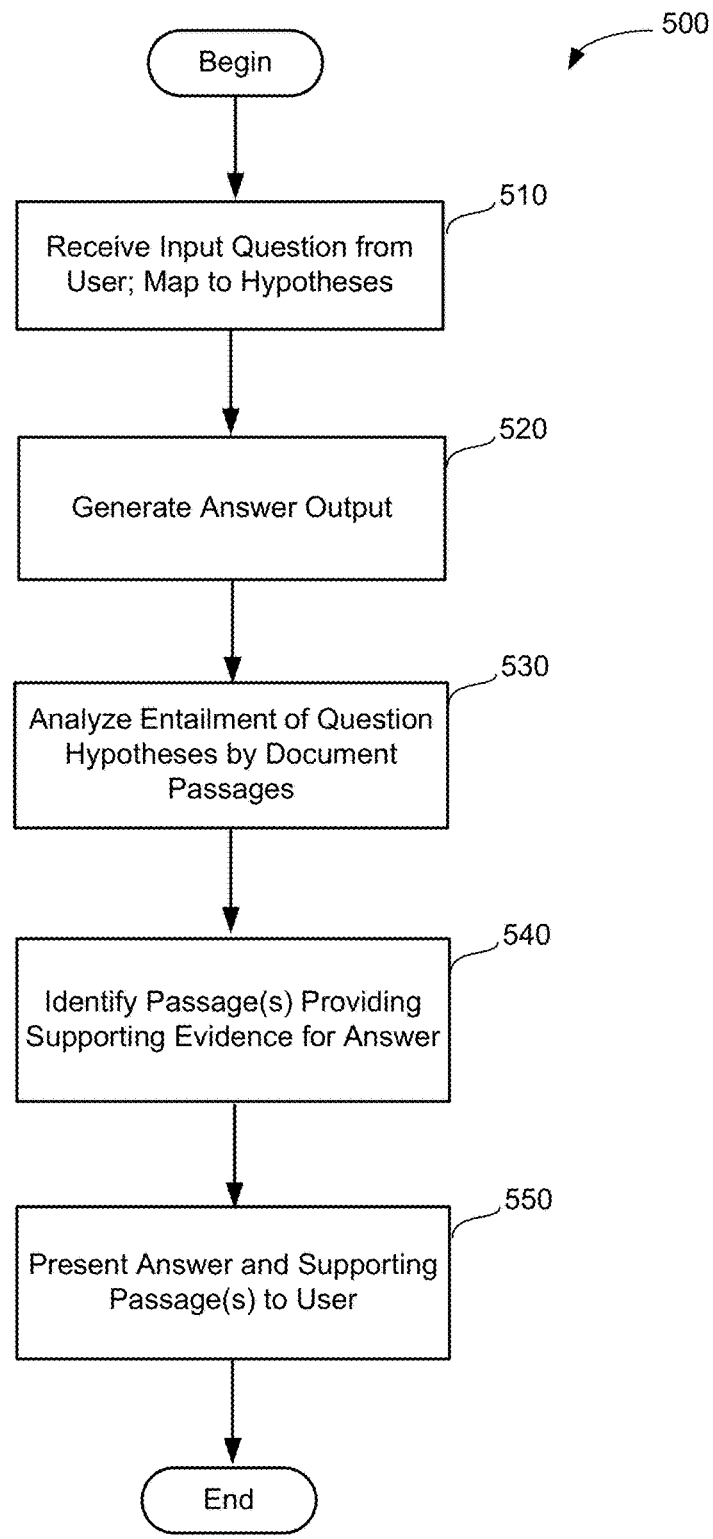
FIG. 5 is a flowchart of another exemplary method for question answering in accordance with some embodiments.

It should be further appreciated from the foregoing that another embodiment is directed to a method 500 for question answering, as illustrated in FIG. 5. Method 500 may be performed, for example, by one or more components of a question answering system such as evidence scorer 180 and/or answer builder 190, although other implementations are possible and method 500 is not limited in this respect. Method 500 begins at act 510, at which an input question may be received from a user. As above, in some embodiments, this may be a text input expressing the question in natural language. In some embodiments, as described in detail above, the question may be mapped to one or more hypotheses. At act 520, an output (which may be a text output or other form of output) expressing an answer to the question may be generated. Exemplary techniques for doing so are discussed above.

At act 530, documents containing natural language text may be analyzed, including analyzing one or more passages of text in the documents to determine whether the passage entails any of the hypotheses from the question. Exemplary techniques for entailment analysis are described above. At act 540, in response to determining that a passage entails a question hypothesis, the passage may be identified as providing supporting evidence for the generated answer to the question. At act 550, the answer and the passage(s) identified as providing supporting evidence for that answer may be presented to the user in response to the input question. In some embodiments, as discussed above, multiple different passages may be scored based at least in part on the strength of the passages' supporting evidence for the answer to the question, and one or more of the passages may be selected for presentation to the user based on the passages' scores.

In some embodiments, as described above, generating the answer output may include determining the answer based at least in part on the text in one or more supporting passages. In some embodiments, different passages may support different possible answers, and a decision/selection may be made between the different possible answers in generating the answer output. For example, in some embodiments, a comparison may be made between how many documents have passages supporting a first answer and how many documents have passages supporting a second answer, and/or a comparison may be made between the strength of the different passages' supporting evidence for the different answers, and one of the possible answers may be selected based on such comparisons. In another example, the input question may pose multiple constraints, which may be identified and matched to different document passages. A suitable answer to the input question may be identified as one supported by a set of passages that in combination match the multiple constraints of the question identified as being answerable from unstructured data. In some embodiments, one or more supporting passages may be selected for presentation to the user based at least in part on how many of the question's constraints are matched to the passage(s).

Figure 6:
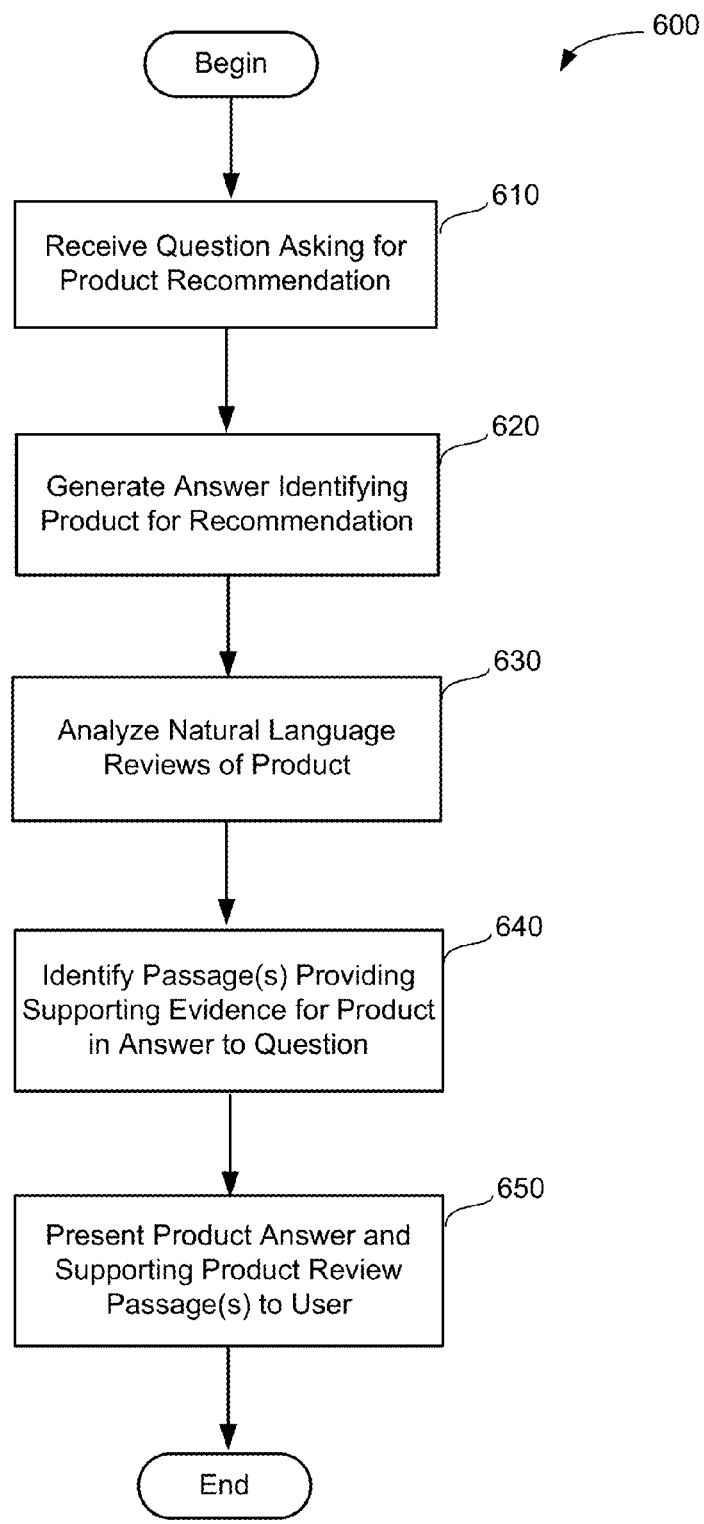
FIG. 6 is a flowchart of an exemplary method for product recommendation in accordance with some embodiments.

It should be further appreciated from the foregoing that another embodiment is directed to a method 600 for product recommendation, as illustrated in FIG. 6. Method 600 may be performed, for example, by one or more components of a question answering system such as QA system 100, although other implementations are possible and method 600 is not limited in this respect. Method 600 begins at act 610, at which a question asking for a product recommendation may be received from a user. At act 620, an answer that identifies a product for recommendation to the user may be generated in response to the question. Exemplary techniques for doing so are described in detail above. In some embodiments, the generated answer may include information about the recommended product, such as the product's name, brand, model identifier, an image of the product, a price for the product, an identification of a merchant offering the product for sale, etc.

At act 630, product reviews containing natural language text evaluations of the product may be analyzed. As discussed above, in some embodiments, a product review may include an evaluation of the product made by a purchaser of the product (e.g., a customer review). In some embodiments, a product review may include an evaluation of the product made based on use of the product by an author of the product review (e.g., a customer review or expert review). At act 640, one or more passages of text in one or more of the product reviews may be identified from the analysis as providing supporting evidence for the product in answer to the user's question. In some embodiments, this may involve scoring passages based at least in part on the strength of their supporting evidence for the product in answer to the question, and selecting one or more of the passages for presentation to the user based at least in part on this scoring. In some embodiments, as described above, the scoring may involve converting the question to one or more hypotheses, and scoring a passage based at least in part on whether its text entails any of the hypotheses. At act 650, the product recommendation answer and the passage(s) identified/selected as providing supporting evidence for the answer may be presented to the user in response to the input question.

Figure 7:
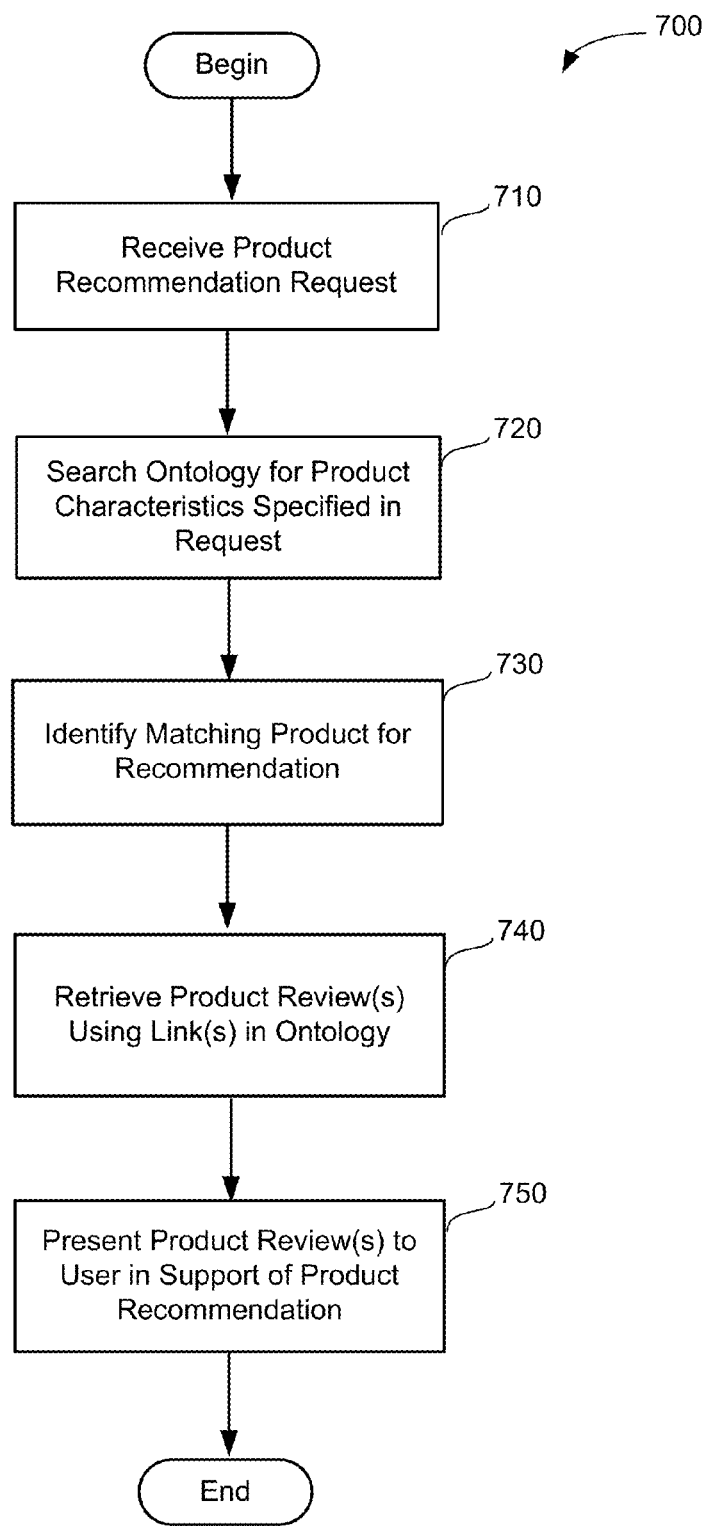
FIG. 7 is a flowchart of another exemplary method for product recommendation in accordance with some embodiments.

It should be further appreciated from the foregoing that another embodiment is directed to a method 700 for product recommendation, as illustrated in FIG. 7. Method 700 may be performed, for example, by one or more components of a question answering system such as QA system 100, although other implementations are possible and method 700 is not limited in this respect. Method 700 begins at act 710, at which a request may be received from a user for recommendation of a product matching one or more characteristics specified in the request. At act 720, an ontology (or other structured data set) may be searched for one or more of the characteristics specified in the request, to identify a product represented in the ontology as matching the searched-for characteristic(s). At act 730, this product may be identified for recommendation in response to the user's request.

The ontology (or other structured data set) may further include one or more links to natural language product reviews providing supporting evidence that the identified product matches the searched-for characteristic(s). At act 740, at least a portion of a product review may be retrieved using the link(s) in the ontology. As above, in some embodiments, a product review may include an evaluation of the product made by a purchaser of the product (e.g., a customer review). In some embodiments, a product review may include an evaluation of the product made based on use of the product by an author of the product review (e.g., a customer review or expert review).

As discussed above, in some embodiments, the ontology may include the identified product as a concept node that has a relationship in the ontology with the searched-for characteristic. Identifying the product for recommendation may include, upon locating a node in the ontology corresponding to the searched-for characteristic, traversing the relationship in the ontology from the characteristic to the product concept node to identify the product. In some embodiments, the relationship may be encoded as a data item in the ontology, and a supporting product review may be linked to that data item. Retrieving the product review may then involve following the link from the data item encoding the relationship in the ontology.

In some embodiments, identifying the product for recommendation may involve determining that the product is represented in the ontology as matching a first characteristic specified in the user's request, retrieving a product review about the product matching the first characteristic, and then determining that the product also matches a second characteristic specified in the request, based at least in part on analysis of the text in the product review. In some embodiments, the ontology may then be updated to include a relationship between the identified product and the second characteristic the product was determined to match based on the product review. The ontology may also be updated to include a link to that product review in association with the new relationship.

Method 700 ends at act 750, at which retrieved product review(s) may be presented to the user in support of a recommendation of the identified product, in response to the user's product recommendation request.

Figure 8:
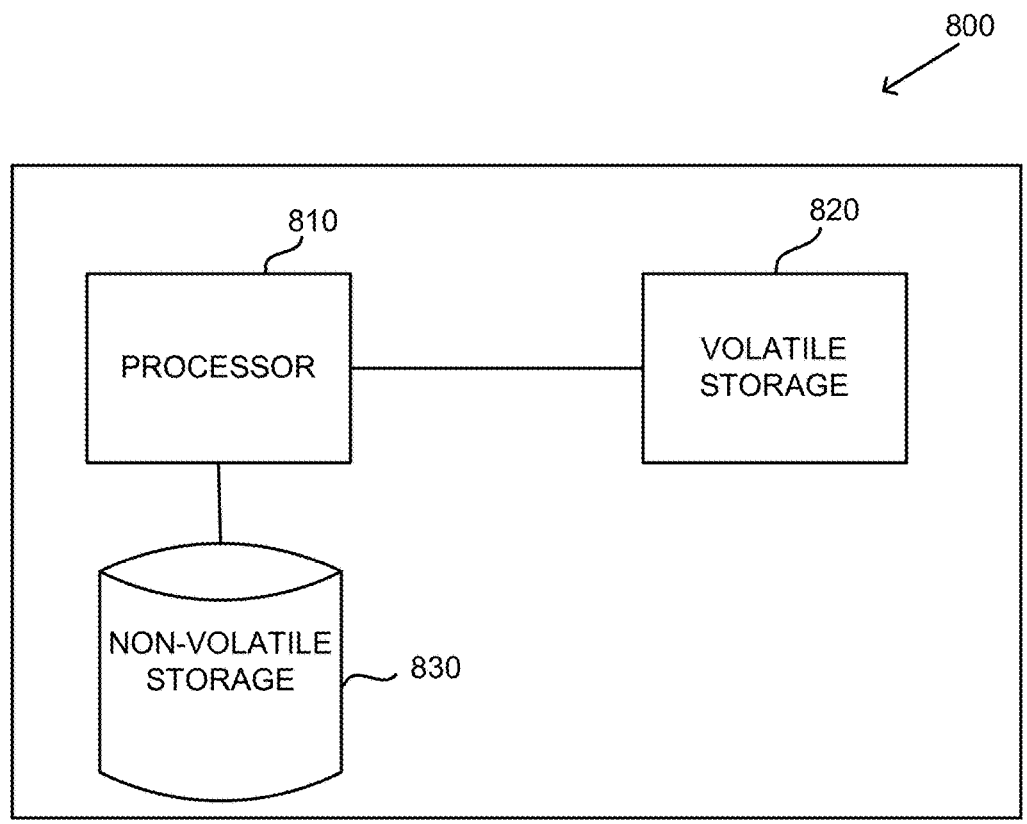
FIG. 8 is a block diagram of an exemplary computer system on which some embodiments may be implemented.

A question answering system in accordance with the techniques described herein may take any suitable form, as embodiments are not limited in this respect. An illustrative implementation of a computer system 800 that may be used in connection with some embodiments is shown in FIG. 8. One or more computer systems such as computer system 800 may be used to implement any of the functionality described above. The computer system 800 may include one or more processors 810 and one or more computer-readable storage media (i.e., tangible, non-transitory computer-readable media), e.g., volatile storage 820 and one or more non-volatile storage media 830, which may be formed of any suitable data storage media. The processor 810 may control writing data to and reading data from the volatile storage 820 and the non-volatile storage device 830 in any suitable manner, as embodiments are not limited in this respect. To perform any of the functionality described herein, the processor 810 may execute one or more instructions stored in one or more computer-readable storage media (e.g., volatile storage 820 and/or non-volatile storage 830), which may serve as tangible, non-transitory computer-readable media storing instructions for execution by the processor 810.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one computer-readable storage medium (i.e., at least one tangible, non-transitory computer-readable medium), such as a computer memory (e.g., hard drive, flash memory, processor working memory, etc.), a floppy disk, an optical disk, a magnetic tape, or other tangible, non-transitory computer-readable medium, encoded with a computer program (i.e., a plurality of instructions), which, when executed on one or more processors, performs above-discussed functions. The computer-readable storage medium can be transportable such that the program stored thereon can be loaded onto any computer resource to implement techniques discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-techniques.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements from each other.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising:
    receiving, from a user, a text input expressing a question asking for recommendation of a product having a first requested characteristic and a second requested characteristic;
    identifying a product having the first requested characteristic, at least in part by locating in an ontology a node corresponding to the first requested characteristic, and traversing a relationship in the ontology from the node corresponding to the first requested characteristic to a node corresponding to the product;
    analyzing, using a natural language analysis component implemented via at least one processor, a plurality of product reviews comprising natural language text evaluations of the product identified from the ontology as having the first requested characteristic, including analyzing the natural language in at least one passage of text in at least one product review of the plurality of product reviews to determine whether the natural language in the at least one passage of text has a meaning indicating that the product also has the second requested characteristic;
    in response to determining via the natural language analysis that the natural language in the at least one passage of text has a meaning indicating that the product also has the second requested characteristic, identifying the at least one passage of text in the at least one product review as providing supporting evidence for the product in answer to the question;
    generating, in response to the question, an answer that identifies the product having the first and second requested characteristics for recommendation to the user; and presenting to the user, in response to the text input, the answer and the at least one passage in the at least one product review identified as providing supporting evidence for the answer.

2. The method of claim 1, wherein the at least one product review comprises an evaluation of the product made by a purchaser of the product.

3. The method of claim 1, wherein the at least one product review comprises an evaluation of the product made based on use of the product by an author of the at least one product review.

4. The method of claim 1, further comprising retrieving the at least one passage in the at least one product review from at least one source selected from the group consisting of: user product reviews, expert product reviews, and social media.

5. The method of claim 1, wherein the answer comprises information about the product, selected from the group consisting of: a name of the product, a brand of the product, a model identifier of the product, an image of the product, a price for the product, and identification of a merchant offering the product for sale.

6. The method of claim 1, wherein analyzing the plurality of product reviews further comprises:
    scoring passages in at least some of the plurality of product reviews based at least in part on strength of the passages' supporting evidence for the product in answer to the question; and
    selecting the at least one passage in the at least one product review for presentation to the user based at least in part on the scoring.

7. At least one computer-readable storage medium storing computer-executable instructions that, when executed, perform a method comprising:
    receiving, from a user, a text input expressing a question asking for recommendation of a product having a requested characteristic;
    generating, in response to the question, an answer that identifies a product having the requested characteristic for recommendation to the user;
    analyzing, using natural language analysis, a plurality of product reviews comprising natural language text evaluations of the product, including analyzing the natural language in at least one passage of text in at least one product review of the plurality of product reviews to determine whether the natural language in the at least one passage of text has a meaning indicating that the product has the requested characteristic, at least in part by converting the question to one or more hypotheses and determining whether the natural language in the at least one passage of text has a meaning that entails at least one of the one or more hypotheses;
    in response to determining via the natural language analysis that the natural language in the at least one passage of text has a meaning indicating that the product has the requested characteristic, identifying the at least one passage of text in the at least one product review as providing supporting evidence for the product in answer to the question; and
    presenting to the user, in response to the text input, the answer and the at least one passage in the at least one product review identified as providing supporting evidence for the answer.

8. The at least one computer-readable storage medium of claim 7, wherein the at least one product review comprises an evaluation of the product made by a purchaser of the product.

9. The at least one computer-readable storage medium of claim 7, wherein the at least one product review comprises an evaluation of the product made based on use of the product by an author of the at least one product review.

10. The at least one computer-readable storage medium of claim 7, wherein the method further comprises retrieving the at least one passage in the at least one product review from at least one source selected from the group consisting of: user product reviews, expert product reviews, and social media.

11. The at least one computer-readable storage medium of claim 7, wherein the answer comprises information about the product, selected from the group consisting of: a name of the product, a brand of the product, a model identifier of the product, an image of the product, a price for the product, and identification of a merchant offering the product for sale.

12. The at least one computer-readable storage medium of claim 7, wherein analyzing the plurality of product reviews further comprises:
    scoring passages in at least some of the plurality of product reviews based at least in part on strength of the passages' supporting evidence for the product in answer to the question; and
    selecting the at least one passage in the at least one product review for presentation to the user based at least in part on the scoring.

13. Apparatus comprising:
    at least one processor; and
    at least one storage medium storing processor-executable instructions that, when executed by the at least one processor, perform a method comprising:
        receiving, from a user, a text input expressing a question asking for recommendation of a product having a requested characteristic;
        generating, in response to the question, an answer that identifies a product having the requested characteristic for recommendation to the user;
        analyzing, using natural language analysis, a plurality of product reviews comprising natural language text evaluations of the product, including analyzing the natural language in at least one passage of text in at least one product review of the plurality of product reviews to determine whether the natural language in the at least one passage of text has a meaning indicating that the product has the requested characteristic, at least in part by converting the question to one or more hypotheses and determining whether the natural language in the at least one passage of text has a meaning that entails at least one of the one or more hypotheses;
        in response to determining via the natural language analysis that the natural language in the at least one passage of text has a meaning indicating that the product has the requested characteristic, identifying the at least one passage of text in the at least one product review as providing supporting evidence for the product in answer to the question; and
        presenting to the user, in response to the text input, the answer and the at least one passage in the at least one product review identified as providing supporting evidence for the answer.

14. The apparatus of claim 13, wherein the at least one product review comprises an evaluation of the product made by a purchaser of the product.

15. The apparatus of claim 13, wherein the at least one product review comprises an evaluation of the product made based on use of the product by an author of the at least one product review.

16. The apparatus of claim 13, wherein the method further comprises retrieving the at least one passage in the at least one product review from at least one source selected from the group consisting of: user product reviews, expert product reviews, and social media.

17. The apparatus of claim 13, wherein the answer comprises information about the product, selected from the group consisting of: a name of the product, a brand of the product, a model identifier of the product, an image of the product, a price for the product, and identification of a merchant offering the product for sale.

18. The apparatus of claim 13, wherein analyzing the plurality of product reviews further comprises:
- scoring passages in at least some of the plurality of product reviews based at least in part on strength of the passages' supporting evidence for the product in answer to the question; and
- selecting the at least one passage in the at least one product review for presentation to the user based at least in part on the scoring.

* * * * *